United States Patent
Lynch et al.

(10) Patent No.: US 7,130,351 B1
(45) Date of Patent: Oct. 31, 2006

(54) STORAGE REDUCTION DURING COMPRESSION

(75) Inventors: William C. Lynch, Palo Alto, CA (US); Krasimir D. Kolarov, Menlo Park, CA (US); D. Robert Hoover, Cupertino, CA (US); William J. Arrighi, El Cerrito, CA (US)

(73) Assignee: Vulcan Patents LLC, Seattle, WA (US)

( * ) Notice: Subject to any disclaimer, the term of this patent is extended or adjusted under 35 U.S.C. 154(b) by 0 days.

(21) Appl. No.: 09/079,101

(22) Filed: May 14, 1998

(51) Int. Cl.
*H04B 1/66* (2006.01)

(52) U.S. Cl. .......................... 375/240.16; 375/240.25; 375/240.26; 375/240.18; 375/240.03; 382/233; 382/235; 382/248; 382/251

(58) Field of Classification Search ................ 375/240, 375/240.16, 240.18, 240.24, 240.25, 240.23, 375/240.26, 240.03; 348/403, 409, 413, 348/416, 15, 402; 382/238, 240, 233, 235, 382/246, 248, 251
See application file for complete search history.

(56) References Cited

U.S. PATENT DOCUMENTS

| | | | | |
|---|---|---|---|---|
| 5,544,266 A | * | 8/1996 | Koppelmans et al. | 382/238 |
| 5,812,788 A | * | 9/1998 | Agarwal | 395/200.77 |
| 5,970,233 A | * | 10/1999 | Liu et al. | 709/246 |
| 5,991,816 A | * | 11/1999 | Percival et al. | 709/247 |
| 6,058,215 A | * | 5/2000 | Schwartz et al. | 382/244 |
| 6,130,911 A | * | 10/2000 | Lei | 375/240.16 |
| 6,272,180 B1 | * | 8/2001 | Lei | 375/240.16 |
| 6,289,132 B1 | * | 9/2001 | Goertzen | 382/240 |

FOREIGN PATENT DOCUMENTS

| | | |
|---|---|---|
| EP | 0535272 | 7/1993 |
| EP | 0622961 | 11/1994 |
| EP | 0687111 | 12/1995 |
| JP | 07087496 | 3/1995 |
| WO | 96/24222 | 8/1996 |

OTHER PUBLICATIONS

"Low Cost Multiformat Video Codec", 1997, Analog Devices ADV601 Rev. 0.
"Crew Summary", May 1998, RICOH Website at www.crc.ricoh.com.
Boliek et al., "Crew Lossless/Lossy Image Compression", Jun. 1995, WGI Meeting in France, IOS/IEC JTC I/S C29/WG 1 N196.
"Double Compression. Oct. 1972", IBM Technical Disclosure Bulletin, vol. 15, No. 5, pp. 1698-1699.

* cited by examiner

*Primary Examiner*—Shawn S. An
(74) *Attorney, Agent, or Firm*—Van Pelt, Yi & James LLP

(57) ABSTRACT

Decompressing compressed video information using relatively less temporary storage is disclosed. A compressed bit stream of video information including a compressed portion is received. A reverse combination in the transform domain is performed on the compressed portion to produce two corresponding portions of video information, where the two portions represent the compressed portion in a less compressed form. The two portions of video information are temporarily stored as a reverse combination is being performed. One of said two portions of video information is transformed, decoded, and decompressed to produce a decompressed portion of video information. The decompressed portion of video information is output.

4 Claims, 20 Drawing Sheets

Stripe After Horizontal Filtering

Block After Pass 2 Filtering

Block After Pass 3 Filtering

Block After Pass 4 Filtering

Block After Pass 5 Filtering

STORAGE REDUCTION DURING COMPRESSION

This application is related to U.S. patent applications No. 09/079,104 entitled "Compression of Combined Black/White and Color Video Signal", U.S. Pat. No. 6,229,929, issued 8 May 2001 entitled "Border Filtering of Video Signal Blocks" and No. 09/079,427 entitled "Color Rotation Integrated With Compression of Video Signal", all filed on the same date herewith, and each of which is hereby incorporated by reference.

FIELD OF THE INVENTION

The present invention relates generally to compression and decompression of data. More specifically, the present invention relates to a good quality video codec implementation that achieves a good compression ratio for low bit rate video.

BACKGROUND OF THE INVENTION

A number of important applications in image processing require a very low cost, fast and good quality video codec (coder/decoder) implementation that achieves a good compression ratio. In particular, a low cost and fast implementation is desirable for low bit rate video applications such as video cassette recorders (VCRs), cable television, cameras, set-top boxes and other consumer devices.

One way to achieve a faster and lower cost codec implementation is to attempt to reduce the amount of memory needed by a particular compression algorithm. Reduced memory (such as RAM) is especially desirable for compression algorithms implemented in hardware, such as on an integrated circuit (or ASIC). For example, it can be prohibitively expensive to place large amounts of RAM into a small video camera to allow for more efficient compression of images. Typically, smaller amounts of RAM are used in order to implement a particular codec, but this results in a codec that is less efficient and of less quality.

Although notable advances have been made in the field, and in particular with JPEG and MPEG coding, there are still drawbacks to these techniques that could benefit from a better codec implementation that achieves a higher compression ratio using less memory. For example, both JPEG and motion JPEG coding perform block-by-block compression of a frame of an image to produce compressed, independent blocks. For the most part, these blocks are treated independently of one another. In other words, JPEG coding and other similar forms of still image coding end up compressing a frame at a time without reference to previous or subsequent frames. These techniques do not take full advantage of the similarities between frames or between blocks of a frame, and thus result in a compression ratio that is not optimal.

Other types of coding such as MPEG coding use interframe or interfield differencing in order to compare frames or fields and thus achieve a better compression ratio. However, in order to compare frames, at least one full frame must be stored in temporary storage in order to compare it to either previous or subsequent frames. Thus, to produce the I, B, and P frames necessary in this type of coding, a frame is typically received and stored before processing can begin. The amount of image data for one frame can be prohibitive to store in RAM, and makes such codec implementations in hardware impractical due to the cost and the size of the extra memory needed. In particular, these codec implementations on an integrated circuit or similar device can be simply too expensive due to the amount of memory required.

Previous efforts have attempted to achieve better compression ratios. For example, the idea of performing operations in the DCT transform domain upon a whole frame has been investigated before at UC Berkeley and at the University of Washington for a variety of applications such as pictorial databases (zooming in on an aerial surface map with a lot of detail).

Thus, it would be desirable to have a technique for achieving an improved compression ratio for video images while at the same time reducing the amount of storage needing to be used by the technique. In particular, it would be desirable for such a technique to reduce the amount of memory needed for an implementation on an integrated circuit.

Boundaries between blocks also present difficulties in compression of video images. A brief background on video images and a description of some of these difficulties will now be described. FIG. 1 illustrates a prior art image representation scheme that uses pixels, scan lines, stripes and blocks. Frame 12 represents a still image produced from any of a variety of sources such as a video camera, a television, a computer monitor etc. In an imaging system where progressive scan is used each image 12 is a frame. In systems where interlaced scan is used, each image 12 represents a field of information. Image 12 may also represent other breakdowns of a still image depending upon the type of scanning being used. Information in frame 12 is represented by any number of pixels 14. Each pixel in turn represents digitized information and is often represented by 8 bits, although each pixel may be represented by any number of bits.

Each scan line 16 includes any number of pixels 14, thereby representing a horizontal line of information within frame 12. Typically, groups of 8 horizontal scan lines are organized into a stripe 18. A block of information 20 is one stripe high by a certain number of pixels wide. For example, depending upon the standard being used, a block may be 8×8 pixels, 8×32 pixels, or any other in size. In this fashion, an image is broken down into blocks and these blocks are then transmitted, compressed, processed or otherwise manipulated depending upon the application. In NTSC video (a television standard using interlaced scan), for example, a field of information appears every 60th of a second, a frame (including 2 fields) appears every 30th of a second and the continuous presentation of frames of information produce a picture. On a computer monitor using progressive scan, a frame of information is refreshed on the screen every 30th of a second to produce the display seen by a user.

FIG. 2 illustrates an image 50 that has been compressed block-by-block and then decompressed and presented for viewing. Image 50 contains blocks 52–58 having borders or edges between themselves 62–68. Image 50 shows block boundaries 62–68 having ghosts or shadows (blocking artifacts). For a variety of prior art block-by-block compression techniques, the block boundaries 62–68 become visible because the correlation between blocks is not recognized. Although the block boundaries themselves may not be visible, these blocking artifacts manifest themselves at the block boundaries presenting an unacceptable image.

One technique that is useful for compressing an image block-by-block is to use a 2–6 Biorthogonal filter to transform scan lines of pixels or rows of blocks. A 2–6 Biorthogonal filter is a variation on the Haar transform. In the 2–6 Biorthogonal filter sums and differences of each pair of pixels are produced as in the Haar transform, but the differences are modified (or "lifted") to produce lifted difference values along with the stream of sum values. In the traditional 2–6 Biorthogonal filter, the stream of sum values are represented by the formula: $s_i=x_{2i}+x_{2i+1}$, the x values representing a stream of incoming pixels from a scan line. Similarly, the stream of difference values are represented by the formula: $d_i=x_{2i}-x_{2i+}$. The actual lifted stream of difference values that are output along with the stream of sum values are represented by the formula $w_i=d_i-s_{i-1}/8+s_{i+1}/8$. The 2–6 Biorthogonal filter is useful because as can be seen by the formula for the lifted values "w", each resultant lifted value "w" depends upon a previous and a following sum of pairs of pixels (relative to the difference in question). Unfortunately, this overlap between block boundaries makes the compression of blocks dependent upon preceding and succeeding blocks and can become enormously complex to implement. For example, in order to process the edges of blocks correctly using the above technique a block cannot be treated independently. When a block is removed from storage for compression, part of the succeeding block must also be brought along and part of the current block must also be left in storage for the next block to use. This complexity not only increases the size of the memory required to compress an image, but also complicates the compression algorithm.

Prior art techniques have attempted to treat blocks independently but have met with mixed results. For example, for a 2–6 Biorthogonal filter the value of $w_1$ is calculated using the very first sum ($s_0$) and the third sum calculated ($S_2$). However, calculation of the very first lifted value ($w_0$) proves more difficult because there is no previous sum with which to calculate the value if the blocks are to be treated independently. The same difficulty occurs at the end of a block when the final lifted value ($w_{n-1}$) is to be calculated, because again, there is no later sum of pixels to be used in the calculation of this final lifted value if the blocks are to be treated independently. (I.e., a block to be treated independently should not rely upon information from a previous or succeeding block.)

One solution that the prior art uses is to simply substitute zeros for the coefficients (the sum values) in these situations if data values are not known. Unfortunately, this practice introduces discontinuities in the image between blocks and blocking artifacts occur as shown in FIG. 2. The artifacts occur mainly due to zero values being inserted for some values in the calculation of the initial and final lifted values in the 2–6 Biorthogonal filter. Therefore, it would be desirable for a technique and apparatus that would not only be able to process blocks independently to reduce memory and complexity, but also would do away with ghosts, shadows and other blocking artifacts at block boundaries.

There is a third difficulty associated with processing a video signal which relates to a color carrier. Color rotation of color information in a video signal typically requires intensive computations. Color rotation is often required to transform a color signal from one coordinate system (or color space) to another. Common coordinate systems are RGB (for television monitors), YIQ (for NTSC television), and YUV (for component video and S video). For example, for an image that is in the YUV system (as in many drawing programs), a complex matrix multiplication must be performed to put the image into the RGB system for presentation on a television monitor. Such matrix multiplication requires intensive calculations and larger devices. For example, some color rotations require more computation than all the rest of a compression algorithm, and often a separate semiconductor device is used just to perform the color rotation. Thus, prior art color rotation techniques are relatively slow and costly.

FIGS. 19 and 20 show an example of a prior art color rotation technique. FIG. 19 illustrates frame portions 12a and 12b that represent respectively Y color information and U color information of frame 12. In this example, frame 12 is represented in YUV color coordinates common in component video (Y, or luminance information, not shown). Pixel values a(U) 752 and a(V) 754 represent pixels in corresponding positions of frames 12a and 12b, respectively.

FIG. 20 illustrates a prior art technique 760 for color rotation of information in frame 12 into a different color coordinate system. Each pair of corresponding pixel values 764 (a two entry vector) from frame portions 12a and 12b are multiplied by a rotation matrix R 762 to produce values 766 in the new coordinate system. New values 766 represent the same colors as values 764, but using the different coordinate system. Rotation matrices R have well known values for converting from one coordinate system to another and are 2×2 matrices for converting to YIQ or YUV. Conversion to RGB requires a 3×3 rotation matrix (a three-dimensional rotation). Thus, color rotation requires either two or three multiplications per element (per pixel) of a frame. The sheer number of these multiplications make color rotation slow and expensive. Also, the pixel coefficients can be quite large, further intensifying the computations. Therefore, it would be desirable to be able to perform color rotation on a signal without requiring the previous amounts of processing power and device sizes needed.

A fourth difficulty in the prior art exists with respect to compressing composite video and S video signals, i.e., signals that combine colors and/or intensity. In the early days of television it was discovered that the frequency spectrum of a black and white video signal had a large number of unpopulated regions or "holes". Based upon this discovery, it was determined that a color carrier of approximately 3.6 MHz could be added to the black and white (intensity) signal that would "fill in" these unpopulated regions in the frequency spectrum of the black and white signal. Thus, black and white signal information could be added to a color carrier to produce a composite video signal that, for the most part, kept color and black and white information from interfering with one another. Such a composite video signal 82 and a black and white signal 88 is shown in FIG. 3. Typically, the color carrier signal is modulated by splitting it into two phases 84 and 86 (using quadrature modulation) that are 90° out of phase with each other. Each phase carries one color for the color signal. Each phase is then amplitude modulated, the amplitude of each phase indicating the amplitude of its particular color. Combining signals 84, 86 and 88 produces composite signal 82. Using known techniques, the combination of the two color signals from each phase of the color carrier can be combined with the black and white (intensity) signal to provide the third color. In addition, because the human eye cannot detect high frequency color, the color carrier is often band limited meaning that its frequency does not change greatly.

It is also common to sample a composite video signal at four times the color carrier frequency, often about a 14.3 MHz sampling rate. Signal 82 shows sample points 90–96 illustrating a four times sampling rate for the color carrier signal. Such a sampling rate allows both the carrier and its two phases to be detected and measured; thus, the two phases of the color carrier can be separated out.

Prior art techniques have found it difficult to directly compress such a composite video signal 82. Most prior art techniques separate out the color signals from the black and white signal before compression. Thus, signals 84, 86 and 88 must be separated out from composite signal 82 before compression of the composite signal can begin. This separation of color is expensive and time consuming. Not only are three different algorithms typically needed, but extra hardware may be required. Compression in hardware is often made more complex and costly because of the composite signal. One prior art technique separates out the color signal in analog by using passive components outside of the chip that performs the compression. The three different signals are then fed separately to the compression chip, increasing complexity. Alternatively, separation of the color signal can be done on-chip but this requires extremely large multipliers which greatly increase the size of the chip.

Therefore, it would be desirable for a technique that could handle compression of a composite video signal directly without the need for prior separation of signals or excess hardware. It would be particularly desirable for such a technique to be implemented upon an integrated circuit without the need for off-chip separation, or for large multipliers on-chip. Such a technique would also be desirable for S video and component video. In general, any combined video signal that includes black and white and color information that needs to be separated during compression could benefit from such a technique.

The handling of the different types of video in compression is a fifth area in the prior art that could also benefit from improved techniques. There are three major types of video: composite video; S video; and component video. Composite video is single signal that includes the black/white signal with a color carrier. Modulated onto the color carrier are two chrominance signals. S video is a compromise between composite video and component video. S video has two signals, a Y signal for black and white information and a single chrominance signal. The single chrominance signal is made up of a color carrier with U and V color signals modulated onto the color carrier. Component video contains three separate signals. A Y signal for black and white information, a U signal for chrominance one information and a V signal for chrominance two information. When compression of a video signal is performed on an integrated circuit in the prior art, the identification of one of the three types of video signals and preprocessing of that signal is performed off-chip. Prior art techniques have yet to devise an efficient compression algorithm on a single chip that is able to identify and to handle any of the three types of video on the chip itself. If would therefore be desirable for a technique and apparatus by which an integrated circuit could itself handle all three types of video signals and compress each these signals efficiently.

SUMMARY OF THE INVENTION

To achieve the foregoing, and in accordance with the purposes of the present invention, an apparatus and technique for compressing video images are disclosed that address the above difficulties in the prior art.

A first embodiment of the present invention uses temporary compression of portions of an image during the overall compression of the complete sequence of images to reduce the amount of temporary storage needed. In particular, this embodiment reduces by a factor of ten the temporary storage needed for interfield and interframe transform-based video compression. In one specific implementation of this embodiment, incoming image data is processed and compressed block-by-block and placed in temporary storage and then decompressed for comparison with subsequent blocks before the eventual final compression of the information. Temporary block-by-block compression and the temporal compression of these blocks (between frames, for example) not only allows for a reduction in the temporary storage needed, but also takes advantage of the relationship between associated blocks of an image in order to produce a better picture when the information is finally decompressed. Taking advantage of temporal compression also produces a higher compression ratio. In particular, this technique is especially useful for a codec implemented on an integrated circuit such where less temporary on-chip storage is needed and the chip can be made smaller and faster. Implementation of such a powerful codec on a relatively small and inexpensive integrated circuit provides efficient and high quality video compression in a small device such as a camera or other consumer goods.

In a nutshell, this first embodiment compresses data block-by-block before comparing one block of a first image with its corresponding block in the next succeeding image using a Haar transform. The resulting block can then be encoded and output in a more compressed form. Prior art techniques do not utilize the advantage of temporarily compressing a block and storing it while waiting for its corresponding block to be input. For example, in JPEG and motion JPEG compression video images are generally processed block-by-block and blocks are output in compressed form. There is no notion of temporarily storing compressed blocks in order to compare blocks of a previous image with corresponding blocks of a succeeding image. Other compression algorithms such as those used in MPEG do temporarily store blocks in order to compare a block of a frame to its corresponding block in a later frame. However, storage of these blocks on an integrated circuit (or other device) requires an extraordinary amount of memory which makes the device unnecessarily large and provides a disincentive to perform comparison of corresponding blocks. Advantageously, the present invention stores blocks in a compressed form for comparison with corresponding blocks of a later image. Far less memory is needed on the device to store these compressed blocks. Also, less memory bandwidth is needed for transferring these compressed blocks between memory and a processing unit.

In a specific embodiment, a block is transformed, quantized, and encoded before temporary storage in a much compressed form. Later, when a corresponding block from a later frame arrives, the corresponding block is similarly compressed and stored. Next, both blocks are decoded back into the transform domain. Advantageously, it is not necessary to perform the reverse transform on the stored blocks after decoding them. The two blocks may be compared in the transform domain. Once the two blocks have been compared, the result is encoded and output as a serial bit stream in a greatly compressed form.

This embodiment greatly reduces the resources required in hardware or software for interframe or interfield video compression. The invention allows for the advantageous comparison of frames or fields but obviates the need to temporarily store a complete frame or field. In particular, the benefits achieved include: less temporary storage required (such as less RAM on an ASIC); lower memory bandwidth requirements between temporary storage (fewer pins on a device and/or faster throughput); reduced computations needed for interframe or interfield comparisons; useful with many compression schemes, such as JPEG, MPEG, H.263 and the like, wavelet compression schemes, etc.; may be used with any transform; and may be used with a variety of standards such as progressive scan and interlaced scan. Also, encoding of blocks can be done using any of a wide variety of techniques.

Another important advantage over prior art compression devices is that intensive operations such as motion compensation in MPEG are not performed. Unlike prior art devices such as the ADV601 available from Analog Devices, Inc. that require multipliers, the present invention uses shift and add for computations. The result is a faster technique and less space required. Also, prior art MPEG compression devices that perform intensive motion compensation are much more complex and expensive (dollar-wise) than their corresponding decompression devices. By contrast, compression and decompression in the present invention have similar complexities; a compression device according to the present invention is relatively less complex and less expensive than an MPEG compression device.

As mentioned above, one important advantage is that earlier frames (or fields or blocks) used as predictors can be kept almost entirely in compressed form throughout the whole process, greatly reducing RAM requirements. This is especially advantageous for implementation on an integrated circuit such as an ASIC where storage area can be one-half to two-thirds of the total area of the chip. For example, for interfield comparisons, only a compressed field buffer of approximately 20 Kbytes per field is needed. In this manner, frame buffers can be greatly reduced or avoided altogether. Images can be reconstructed from the compressed data and the differencing performed on that data. As hardware for decoding is relatively inexpensive, four or five frames worth of data could be decoded at one time. In one alternative embodiment, differencing is not required. An XOR function will work just as well without any carries or borrows. Most all of the signs from the differencing (or XOR) field will be zero. A zerotree can then be used to cache this additional opportunity. Since XORs are reversible computations, the only reason to go back to a totally unpredicted interframe is only for editing for error recovery.

Normally, the delay during compression will be just one stripes worth of data if there is enough bandwidth to sustain the rate stripe due to intracoding. If lower rates are desired, the information can be spread over multiple fields giving twice (including encode and decode) that many fields as the delay. There will normally be a rate spike at an intraframe. However, with fairly long prediction runs, a picture can be easily built up over a few fields or frames. On the predicted field the higher wavelets will be predicted by zero so the "correction" will be the actual wavelet. This achieves a very low rate with a few frames of delay and a couple of frames of transient time at a cut.

An additional advantage is that still images (such as during a pause) that have been compressed and decompressed have the same high quality as running images. Prior art techniques such as MPEG that perform motion compensation operate over a number of frames, thus, running images have good quality but a still image can have a lot of noise. By contrast, the present invention performs compression using two frames at a time or more (with either interfield or interframe comparisons), and still images that have been compressed have much higher quality. In addition, such local compression that does not depend upon motion compensation and prediction among numerous frames means that less temporary storage is needed by the technique or within an integrated circuit that implements it.

In a second embodiment of the present invention a method of color rotation is integrated with compression that uses far less computation. Advantageously, color rotation is performed upon the chrominance transform pyramids after transformation of the video signal rather than performing a rotation on the raw signal itself. Far fewer computations are needed to perform the color rotation. In a specific embodiment, color rotation is performed not only after transformation of the signal, but also after compression as well. Color rotation can be performed using serial multiplication (shift and add) for more efficient processing, rather than being performed upon large coefficients using parallel multiplication.

Color rotation is also useful with respect to color carrier drift. Typically, the color carrier slowly drifts with respect to the horizontal scan lines. When it is one-half cycle (180 degrees) out of synchronization, it reverses the two color quadratures which results in a color negative image being produced. Prior art techniques fix this drift by also doing a color rotation. Correction of carrier drift by rotation also benefits from the fewer computations needed in this embodiment.

In a third embodiment of the present invention, a composite video signal including both color and black and white information can be compressed directly without needing to separate out the color information from the black and white. An efficient compression algorithm is used directly on the composite video signal without the need for extra analog devices off-chip for separating out color, or the need for large multipliers on-chip to separate out color. In particular, a number of passes are used to allow the composite video signal to be compressed directly. Demodulation of the color carrier using sub-band separation is performed in various of the passes to separate out the color carrier information. The sub-band separation also isolates the luminance and chrominance information from the composite video signal. This embodiment is applicable to any combined video signal (such as S video) that combines color information and/or black and white.

In a fourth embodiment, the present invention is able to treat blocks of information independently which greatly reduces the complexity of the compression and reduces the amount of hardware needed. Blocks can be read independently from stripe storage and then transformed, quantized and encoded before comparison with corresponding blocks of other frames or fields. Advantageously, this independent treatment of blocks does not affect the quality of an decompressed image. Blocking artifacts such as ghosts or shadows are greatly reduced. This embodiment takes advantage of the correlation between nearby blocks of a field and between corresponding blocks of successive fields.

In a specific implementation of this embodiment, a two-degree quadratic approximation is drawn through edge points on a block and is assumed to continue across block boundaries. When a 2–6 Biorthogonal filter is used to filter block information in successive passes, the 2–6 filter is modified (a "border" filter) by providing specific numerical values for the initial and final lifted differences ($w_0$ and $w_{n-1}$) rather than simply assigning zero values for their coefficients as is done in the prior art. Assigning specific numerical values for the lifted difference values at the block boundaries allows each block to be treated independently yet still reduces blocking artifacts that would normally occur when an image is decompressed. In a more specific implementation of a modified 2–6 filter, coefficients of $-3/8$, $1/2$ and $-1/8$ have been found to work quite well for the initial lifted difference $w_0$. In other words, $w_0 = d_0 - 3/8 s_0 + 1/2 s_1 - 1/8 s_2$. The coefficients of $1/8$, $-1/2$ and $3/8$ have been found to work quite well for the final lifted difference value $w_{n-1}$; i.e., $w_{n-1} = d_{n-}$ $1 + \frac{1}{8}s_{n-3} + \frac{1}{2}s_{n-2} + \frac{3}{8}s_{n-1}$. Other specific coefficients have been found to produce desirable results also for different types of wavelet filters.

The border filter of this fourth embodiment may be used in any of the passes used to transform the video data, and is especially useful in earlier passes. For an image that is reasonably smooth in a quadratic sense, many of the lifted difference values (the "w" values) will be zero, and the relevant data will reside in the sum values. The data is thus "squeezed" up into the sum values and less temporary storage is needed and better compression results because the many zero values can be reduced during encoding.

The present invention is able to handle each of the three major types of video: composite video; S video; and component video. Initially, the type of video signal is identified by a user to the device implementing the invention, and a mode is set in order to process that type of signal correctly. Advantageously, the output from the horizontal filter is the same no matter which type of video signal is being used. All identification and processing of the video signal can be performed upon a single integrated circuit and extra off-chip hardware for identification and preprocessing of the different types of video signals is not required.

The present invention is useful with a variety of types of images, such as those intended for computer monitors, televisions, cameras, hand-held devices etc., and is applicable to a wide variety of standards such as NTSC video, PAL and SECAM television etc.

Embodiments of the present invention are especially advantageous in low bit rate video applications (such as in consumer technology) where the bandwidth for transmission of compressed images is reduced. For example, color images are typically represented by 24 bits/pixel, which corresponds to a bit rate of approximately 264 Mbits/second. The resent invention is able to compress color images down to one-quarter bit/pixel and lower, while still achieving good quality. One-quarter bit/pixel compression corresponds to a bit rate of approximately 3 Mbits/second. Thus, the lower bit rate is more easily compatible with reduced bandwidth applications where compressed image data may need to share bandwidth with other data such as audio and text.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The various embodiments of the present invention are suitable for implementation independently or in combination in a wide variety of forms. By way of example, the present invention is suitable for implementation in software such as in C++ or any other suitable computer language. The description below is optimized for an eventual hardware implementation (for example, multipliers are avoided where possible), although other software implementations are possible.

The present invention may also be implemented in hardware in standard integrated circuits, in custom integrated circuits such as ASICs, or in a programmable logic device such as an FPGA, a PAL, or a PLA. In one specific implementation of the present invention, implementation on a Xylinx FPGA is used to develop VHDL code. This VHDL code (or more specifically, a macro) can then be combined with other VHDL code to produce a custom integrated circuit useful for placement into a product such as a video camera. Such an implementation on a custom integrated circuit allows for good compression on a relatively small area of silicon. It should be appreciated that the present invention may also be embodied in a wide variety of other hardware description languages.

Furthermore, the embodiments described below are described with respect to a composite video signal, although aspects of the invention are also applicable to other combined signals such as S video, and to separate signals such as component video. Also, although the term "video" is used frequently, it should be appreciated that the present invention is applicable to still images as well as video images, and is also applicable to higher dimension information streams.

The term "video" as used herein applies not only to traditional video information, but also to these other types of images and information.

High Level Block Diagram

Figure 1:
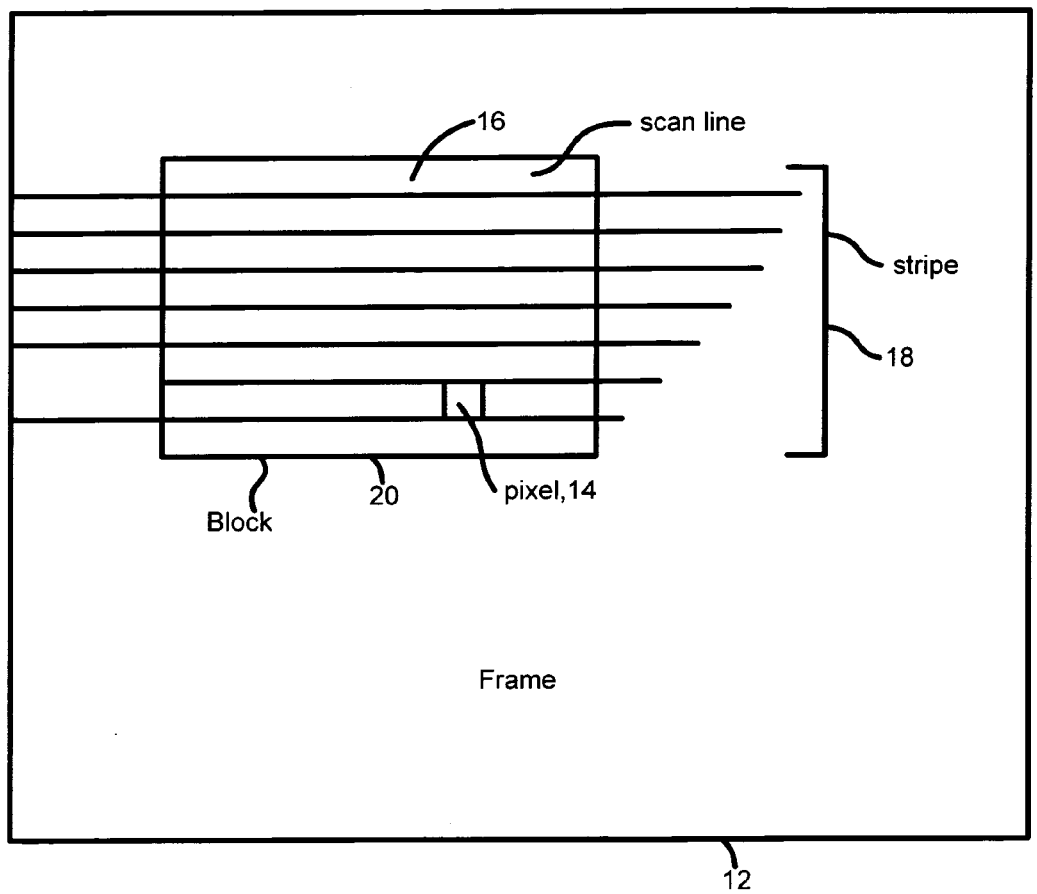
FIG. 1 illustrates a prior art image representation scheme that uses pixels, scan lines, stripes and blocks.
Figure 2:
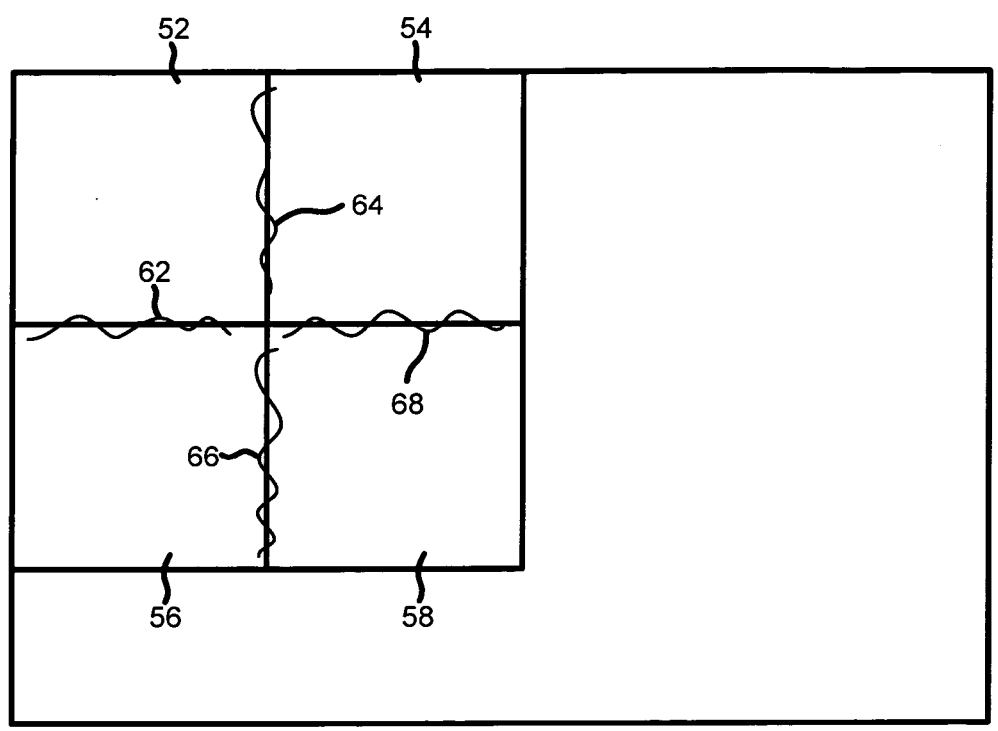
FIG. 2 illustrates a prior art image that has been compressed block-by-block and then decompressed and presented for viewing.
Figure 3:
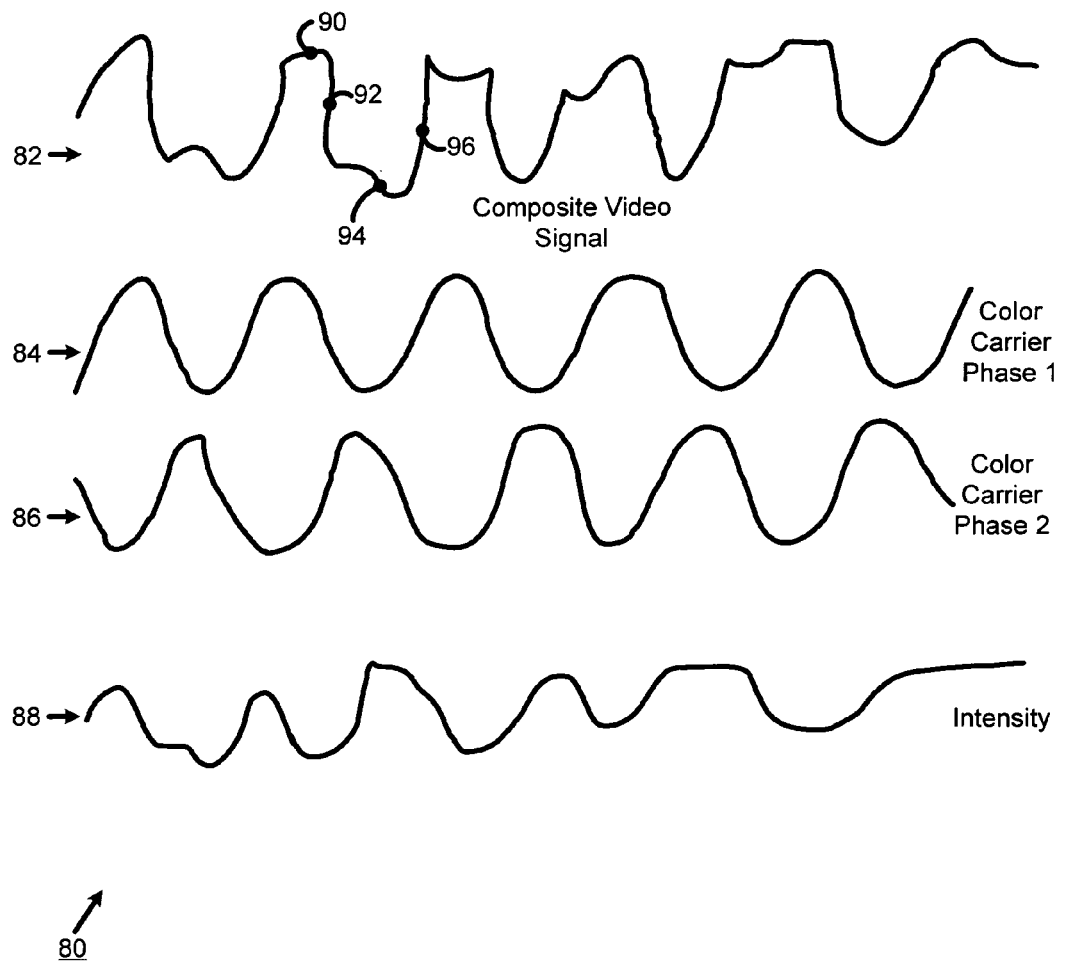
FIG. 3 illustrates prior art intensity and chrominance signals that combine to form a composite video signal.
Figure 4:
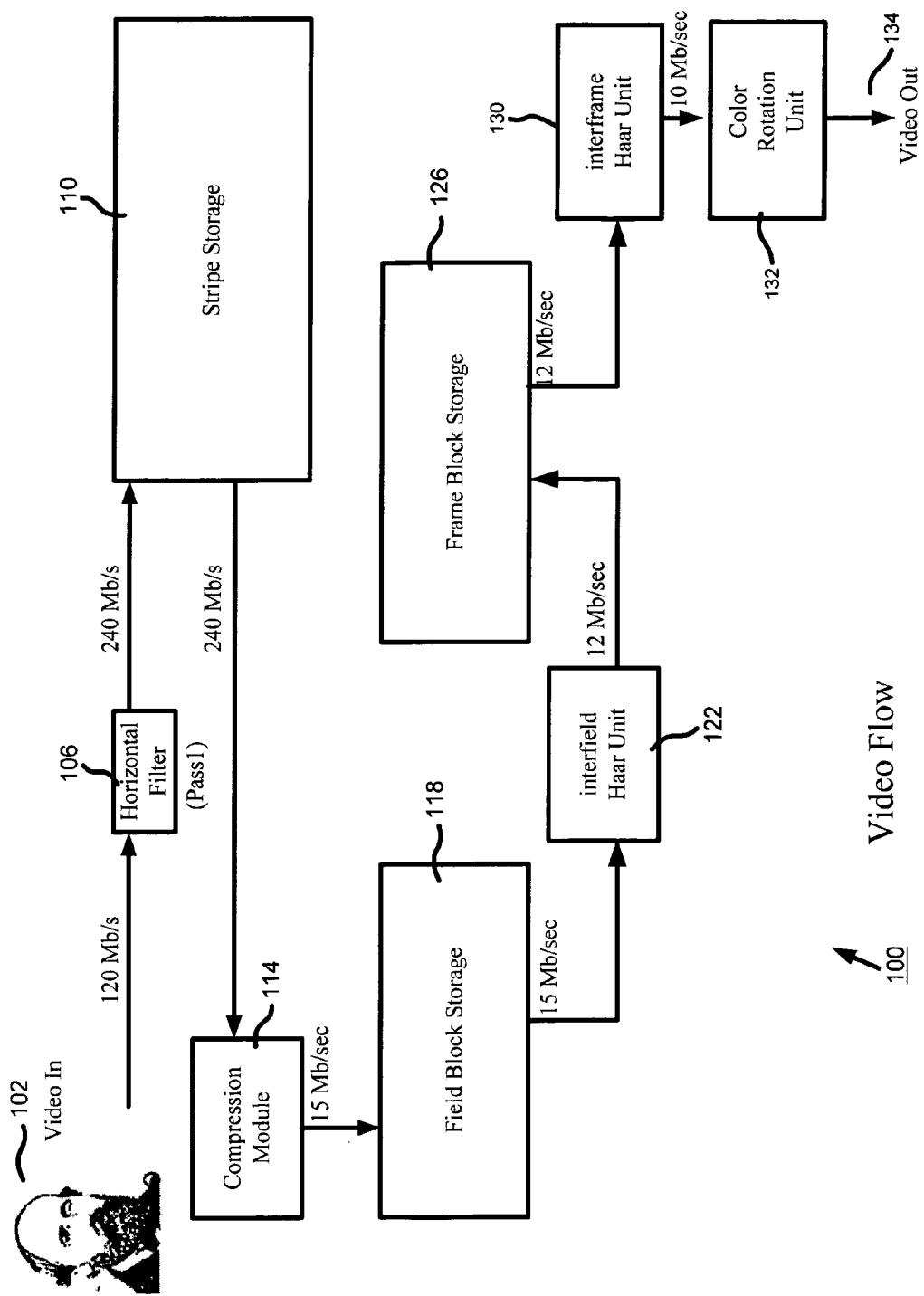
FIG. 4 illustrates a system for compressing a video image according to one embodiment of the present invention.

FIG. 4 illustrates a system 100 for compressing a video image according to one embodiment of the present invention. Details of how each of the parts of system 100 operate are provided below in the flowchart of FIGS. 5A–5C. The following discussion uses compression of a video image for illustrative purposes; it should be appreciated that the present invention is suitable for compressing any of a variety of images containing information, and is not limited to video images. Also, for ease of explanation, FIG. 4 and the following figures discusses compression of an image represented in interlaced scan where each image, or frame, contains two fields. However, those of skill in the art will appreciate that the invention is equally applicable to progressive scan (a field is a frame), or to other standards where many fields may represent a frame. Furthermore, the following description discusses manipulation of pixels, scan lines, stripes and blocks. It should be appreciated that other arbitrary designations for representing hierarchies of information may also be used without departing from the scope of the present invention.

In general, an incoming frame is compressed incrementally block-by-block by performing a transform upon each block and then encoding it. The encoded block (in a much compressed form) is placed in temporary storage. When a corresponding block of a later frame arrives for comparison, transformation and encoding are performed on the later lock. Both blocks are decoded back into the transform domain and the two blocks are compared in the transform domain without the need to perform a reverse transform upon the blocks in order to compare them to one another. By performing block comparison in the transform domain, a costly reverse transform process is avoided. Reduced computation for comparison of the blocks also results because much of the decoded blocks will have zero values. This process of encode-store-decode-compare has many advantages.

System 100 shows an image of a gentleman 102 that is to be compressed using the present invention. Image 102 may be in black and white or in color, and may be received by system 100 as either an analog or digital signal. Preferably, image 102 is received as an analog signal and is digitized and then represented by pixels of information. Digitized information representing image 102 is received by horizontal filter (Pass 1) 106 one scan line at a time. It is also contemplated for other types of video that information can be received a block at a time or in other units. Horizontal filter 106 applies a filter sequence upon each scan line and then passes the result to stripe storage 110. Scan lines are continuously received by filter 106, processed, and sent to stripe storage 110.

Stripe storage 110 is two stripe buffers that hold approximately two stripes' worth of information. As video information is received by system 100 to be compressed, stripe storage 110 is continuously being filled with first even, and then odd stripes from image 102. Scan lines are continuously stored in an even stripe buffer until the buffer is full. The subsequently received scan lines are then continuously stored in an odd stripe buffer and, while this odd buffer is being filled, the previously filled even stripe buffer is being emptied. Thus, once the odd stripe buffer is full, the previously filled even stripe buffer has been emptied and delivered to module 114. Thus, once the odd buffer is full, the even buffer is again ready to receive the next set of scan lines from filter 106. The stripe buffers alternate in receiving and transmitting information in this manner while the image is being input.

For implementation on an integrated circuit, it is preferred that storage 110, 118 and 126 are implemented in DRAMs. DRAMs are much smaller than SRAMs but usually require refresh circuitry. However, because stripes and blocks are being shuffled in and out of their respective storage areas so quickly, the refresh circuitry is not needed. Thus, smaller DRAMs can be used without the additional refresh circuitry.

Because stripe storage 110 fills a stripe buffer before releasing information, information may be read out of stripe storage 110 block-by-block and delivered to module 114. In other words, once stripe storage 110 has been primed with the first two stripes of information, blocks are continuously read from storage 110 and delivered to compression module 114 for compression. Preferably, module 114 transforms, quantifies and encodes each block and delivers the resulting compressed block to field block storage 118. Thus, a stream of compressed blocks are continuously being supplied from module 114 to field block storage 118. Advantageously, these blocks are compressed and temporarily stored before being compared with one another in Haar transform 122. Although the compression on the blocks at this point is not as great as the compression produced in the final output, temporary compression of these blocks allows for greatly reduced sizes of field block storage 118 and frame block storage 126.

The compression performed in module 114 may be any suitable still image compression technique. Compression may be performed upon the whole image, upon blocks, stripes, or any suitable portion of the image. Preferably, module 114 transforms, quantifies and encodes each block as described herein. A transform, if used, may be any suitable transform including linear transforms such as a wavelet transform or DCT. Even non-linear transforms and other techniques such as vector quantization may be used. In a preferred embodiment of the invention, the transformation of each block is performed using a variety of passes labeled Pass 2, Pass 3, Pass 4 and Pass 5; these passes are explained in greater detail below in FIGS. 5A–5C.

Field block storage 118 contains storage large enough for a little over one field's worth of compressed blocks. Advantageously, storage 118 can be made about six times smaller than it would have to be if a field's worth of decompressed blocks needed to be stored. Compression is such that approximately one-and-a-half bits/pixel are being stored. A stream of compressed blocks representing fields is continuously arriving from module 114. Once a field's worth of blocks have been stored in storage 118, and the next field begins to arrive, blocks are removed a pair at a time for delivery to interfield Haar unit 122. In other words, once blocks from the next field begin arriving in storage 118, pairs of corresponding blocks from the two fields are removed and delivered to unit 122. In one particular embodiment, blocks are removed in pairs in scan order, left to right, top to bottom. For example, once a field's worth of blocks have been stored, and the first top left block of the next field arrives in storage 118, its corresponding top left block from the previously stored field are both removed as a pair, thus creating space for more incoming blocks. In this fashion, corresponding blocks from two fields of a frame are delivered to unit 122 in a greatly compressed form for comparison.

Of course, storage 118 may be made larger for easier storage allocation and processing of the incoming and outgoing blocks but with a corresponding detriment due to the greater size of storage required. It should be appreciated that blocks may be removed in pairs in any order and not necessarily in scan order.

Interfield Haar unit 122 receives a pair of corresponding compressed blocks from two fields of a frame and performs a comparison using a slightly modified form of the Haar transform. Advantageously, the two blocks need not be completely decoded and have a reverse transform performed upon them in order to perform a comparison in Haar unit 122. As described below in more detail in FIG. 18, each block is partially decoded and this decoding is integrated with the interfield Haar transform. Blocks need only be decoded to the extent necessary to perform interfield comparison. If transform-based compression has been performed, it is not necessary to undo the transform upon the blocks because the Haar transform can be performed in the transform domain. In general, a linear transform need not be undone, but a non-linear transform may require the transform to be undone. Once the integrated decoding and Haar transform has been performed, the result is encoded again and transmitted to frame block storage 126. At this point, the result of the comparison of the two compressed blocks from successive fields is another, further compressed block that represents the two corresponding blocks from their respective fields. In other words, this compressed block represents the information from one block of the original frame that had been represented in the two fields of that frame.

Frame block storage 126 holds slightly over one frame's worth of compressed blocks. Once one frame's worth of compressed blocks are stored in storage 126 and the compressed blocks from the next successive frame begin to arrive in storage 126, corresponding blocks from these two frames are removed from storage 126 and delivered to interframe Haar unit 130. Compressed blocks representing successive frames arrive continuously in storage 126 and are shuffled and removed in pairs in much the same way as performed in field block storage 118.

Interframe Haar unit 130 receives corresponding pairs of blocks for two successive frames from storage 126 and performs a modified Haar transform upon these two blocks. In a similar fashion as is in unit 122, Haar unit 130 partially decodes each block in an integrated way with the Haar transform, and then encodes the resulting block for output. Advantageously, unit 130 need not perform a reverse transform upon the blocks, but is able to process the blocks in the transform domain after they have been partially or fully decoded. The result from unit 130 is a serial bit stream representing continuous blocks of information that have been greatly compressed. Each compressed block represents a block of information spread across four fields, in other words, each compressed block represents two frame's worth of information.

Following Haar unit 130 is color rotation unit 132 that performs color rotation from one color coordinate system into another. Unit 132 is explained in more detail below in FIG. 21. The resultant compressed video output 134 in serial bit stream form may then be transmitted over a wire, be broadcast, be saved to disk, etc. Advantageously, this greatly compressed video information representing image 102 requires far less bandwidth, transmission time and/or storage space.

Shown in FIG. 4 are examples of possible worst case compression of bit rates. For example, a rate of 120 Mb/s is input to filter 106. The rate is doubled to 240 Mb/s after filter 106 because of the increased precision needed when numbers are added together. After module 114, the rate is reduced to 15 Mb/s, and eventually reaches a low of 10 Mb/s after unit 130. Of course, other lower rates are possible depending upon the implementation of the system.

Compression Flowchart

Figure 5A:
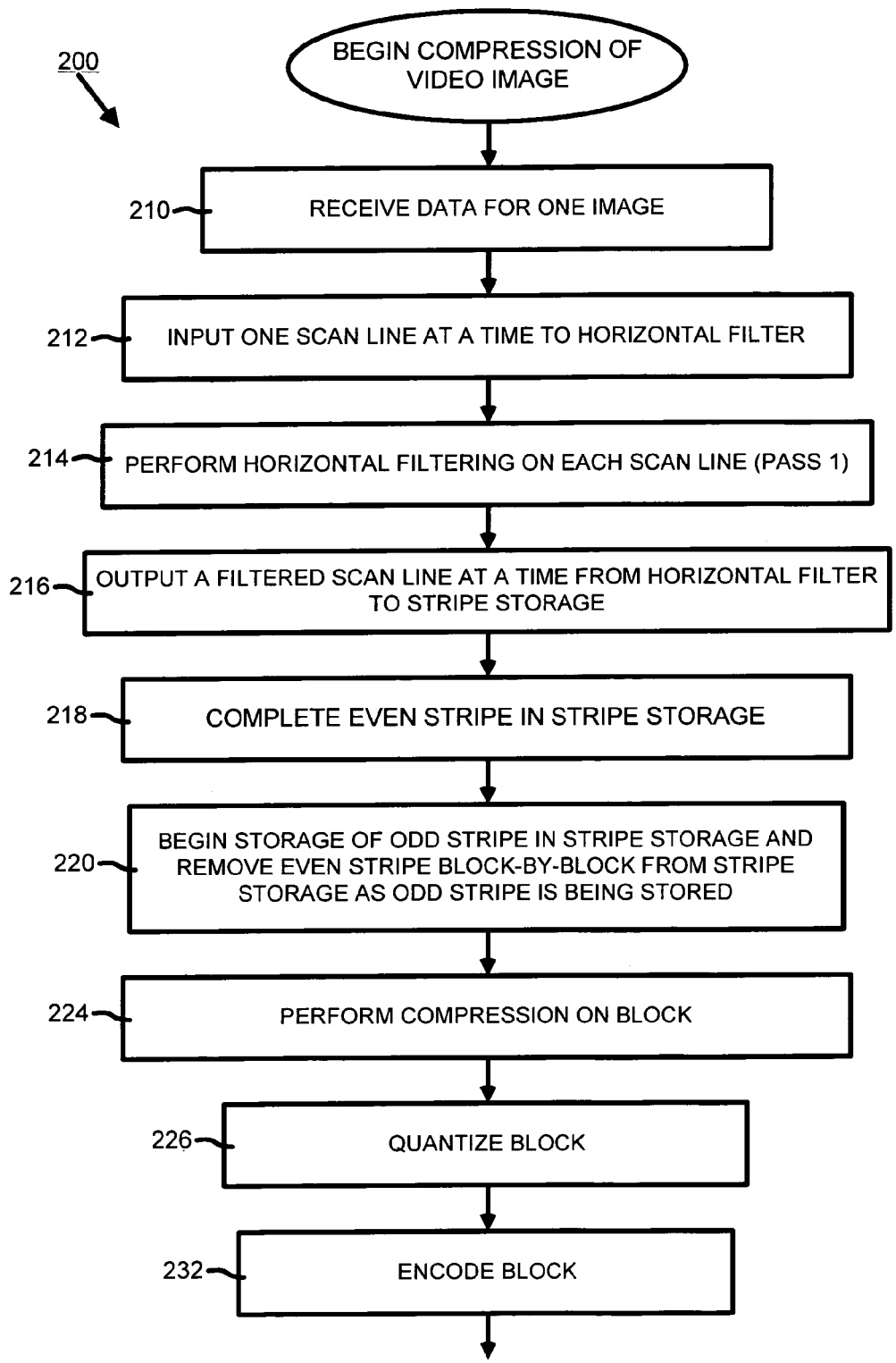
FIGS. 5A, 5B and 5C are a flowchart describing one embodiment for compression of images.
Figure 5B:
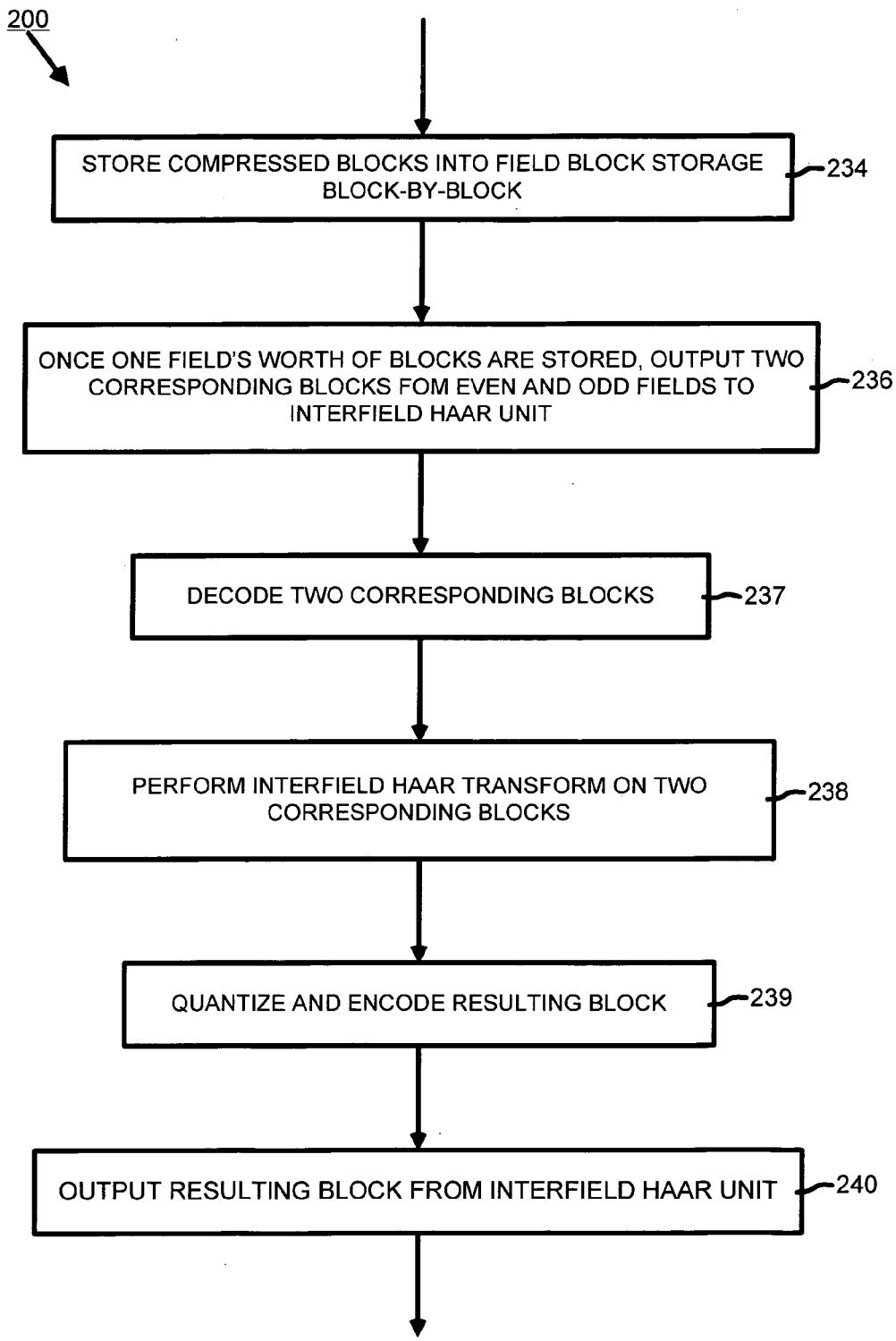
Figure 5C:
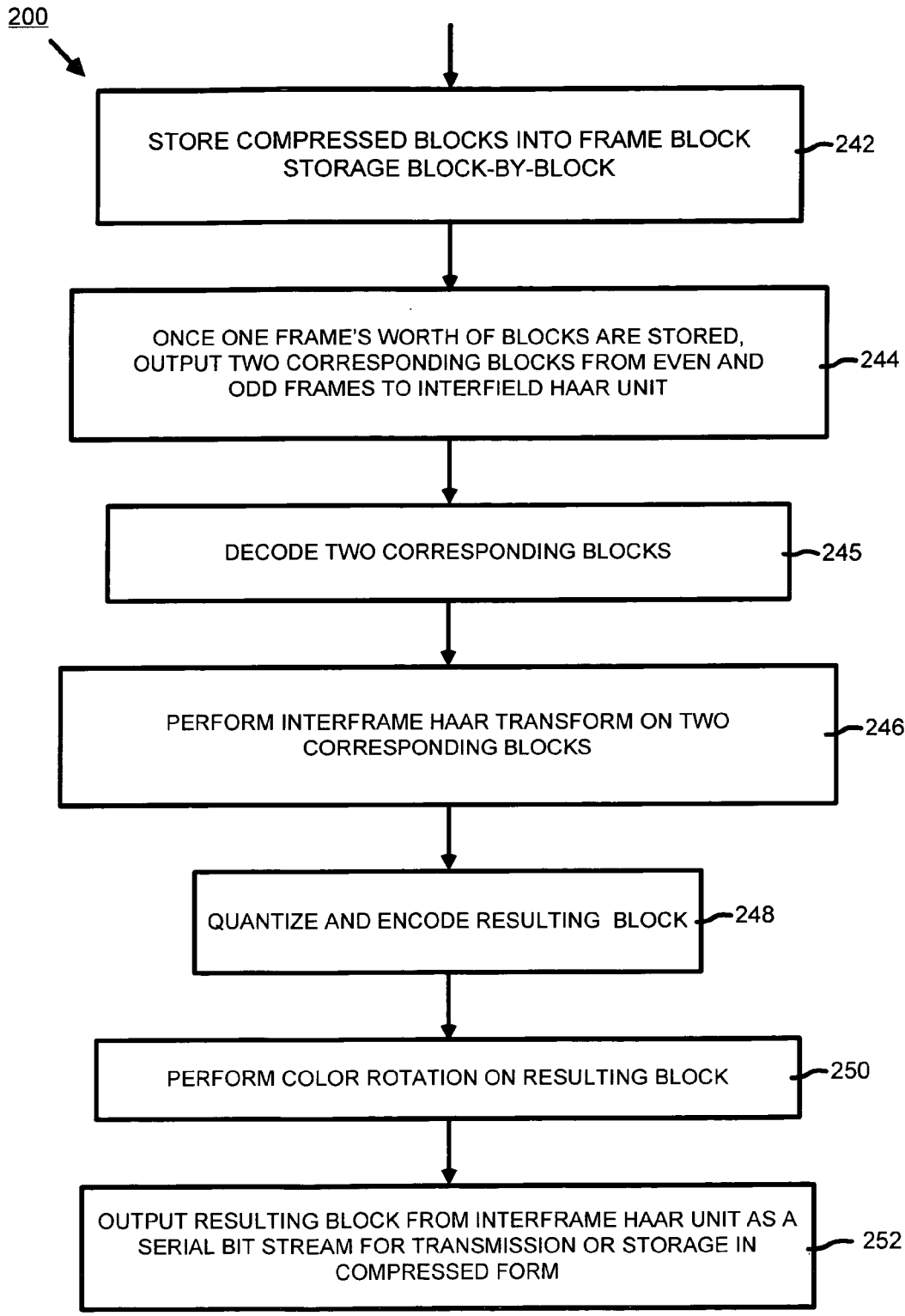

FIGS. 5A, 5B and 5C are a flowchart 200 describing one embodiment for compression of images. This flowchart will be explained with reference to FIG. 4 and FIGS. 6–18. Step 210 receives digitized data from an image 102 as explained in FIG. 4. Preferably, the analog signal representing image 102 is sampled at about four times the frequency of the color carrier (typically 14.3 MHz) and digitized to provide a sequence of 8-bit pixel values. Of course, other sampling rates and sizes of pixel values may also be used. In step 212, one scan line at a time is input to horizontal filter 106. In step 214 filter 106 performs horizontal filtering on each scan line as described below in FIGS. 6–12. The result of this filtering is the transformation of the data in the scan line into the four sub-bands shown in FIG. 12. Once a scan line has been filtered, it is output in step 216 into stripe storage 110 to help complete a stripe in one of the stripe buffers.

The processing of scan lines and the filling up of stripe buffers is a continuous process. Even and odd stripes are continuously being filled up and removed from stripe storage 110 as described in FIG. 4. Step 218 describes a point in time when one of the even stripes is completed in stripe storage. Once this even stripe is completed, in step 220 storage of the next odd stripe is begun and the completed even stripe is removed block-by-block from stripe storage 110.

As blocks are removed, they are compressed in step 224. Any of a wide variety of linear and/or nonlinear transforms may be used, as well as traditional compression techniques. Preferably, they are compressed by performing a sequence of passes. Pass 2 is performed on a block as described in FIG. 13. Pass 3 is performed on a block as described in FIG. 14. Pass 4 is performed on a block as described in FIG. 15, and finally, Pass 5 is performed as described in FIG. 16. It should be appreciated that for blocks having sizes of less than or more than 8×32 pixels that fewer or greater number of passes may be used. Once these five passes have been completed, the block has been successfully compressed.

Step 226 quantizes the block. The quantization that occurs in steps 226, 239 and 248 may be performed in many ways. Quantization is useful for reducing the size of the pixel values and results in negligible loss of information. Although quantization is not strictly necessary, it helps to reduce the size of the data. In a preferred embodiment, a simplified, practical quantization step is performed that quantizes by a power of two in steps 226, 239 and 248. Quantization by a power of two reduces the memory required in field block storage 118 and in frame block storage 126. Thus the present invention can be implemented on a smaller hardware device. Preferably, the number of lower order bits discarded for each coefficient in steps 226, 239 and 248 depends upon the sub-band. The power of two used for each band is an implementation decision depending upon the quality of image desired.

Once the block has been quantized the block is encoded in step 232. A wide variety of encoding techniques may be used. By way of example, entropy coding has been found to work well. For example, Huffman coding, arithmetic coding or LZW coding may be used. Other proprietary coding techniques may also be used such as those described in U.S. patent application Ser. No. 08/607,388 filed Feb. 27, 1996, entitled "Compression of Functions Defined on Manifolds", now U.S. Pat. No. 6,144,773, issued 7 Nov. 2000 and in U.S. provisional application No. 60/050,933, filed May 30, 1997, entitled "Single Chip Motion Wavelet Zero Tree Codec For Image And Video Compression" now regular U.S. patent application Ser. No. 09/087,449, filed 29 May 1998, both of which are hereby incorporated by reference. In general, the encoding algorithm is used to remove redundant information and in particular any groups of zeros produced by quantization. In a preferred embodiment of the invention, standard zerotree encoding is used.

In step 234 the compressed blocks are input into field block storage 118 block-by-block. Once a field's worth of blocks is stored, in step 236 corresponding blocks from successive fields for a frame are output to interfield Haar unit 122. Blocks may be input to, shuffled within, and output from, field block storage 118 in any suitable manner. Preferably, storage 118 is slightly larger than one field's worth of blocks and storage is allocated for the incoming blocks using buffer pools (also called storage pools). For example, once one field's worth of blocks is stored and the first block of the next field is received, the first corresponding blocks from these two fields may be removed. As these two blocks are being removed, the next two blocks for the next field are be input.

Figure 17:
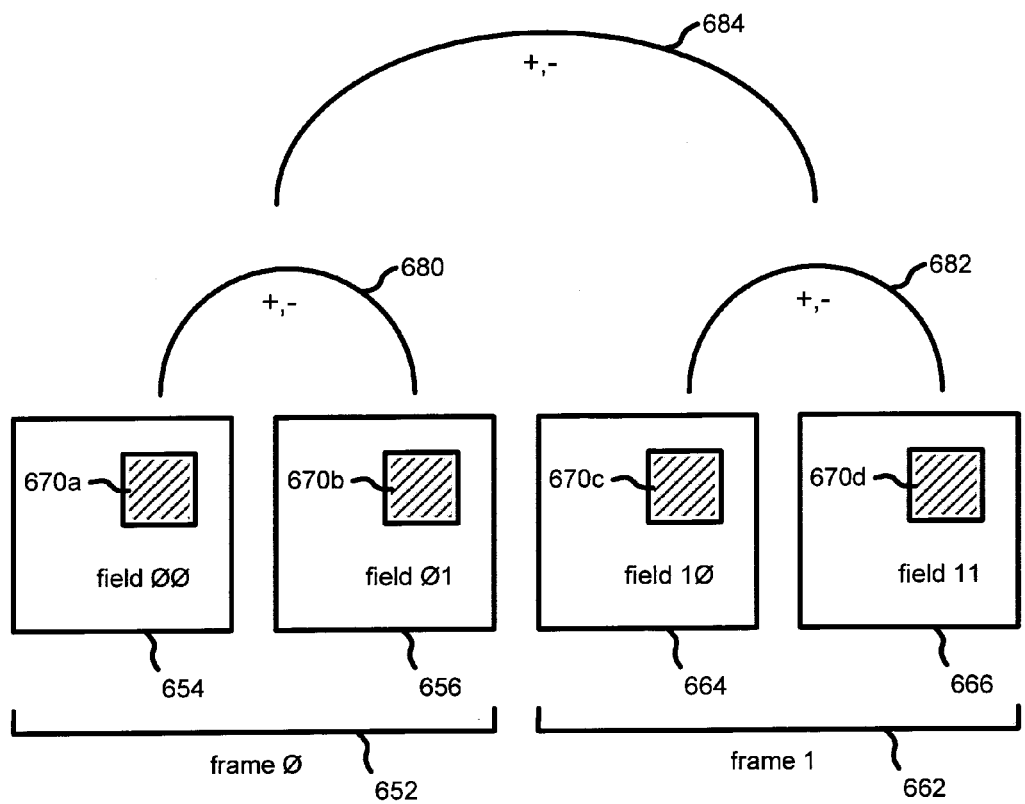
FIG. 17 illustrates the general concept behind a Haar transform.
Figure 18:
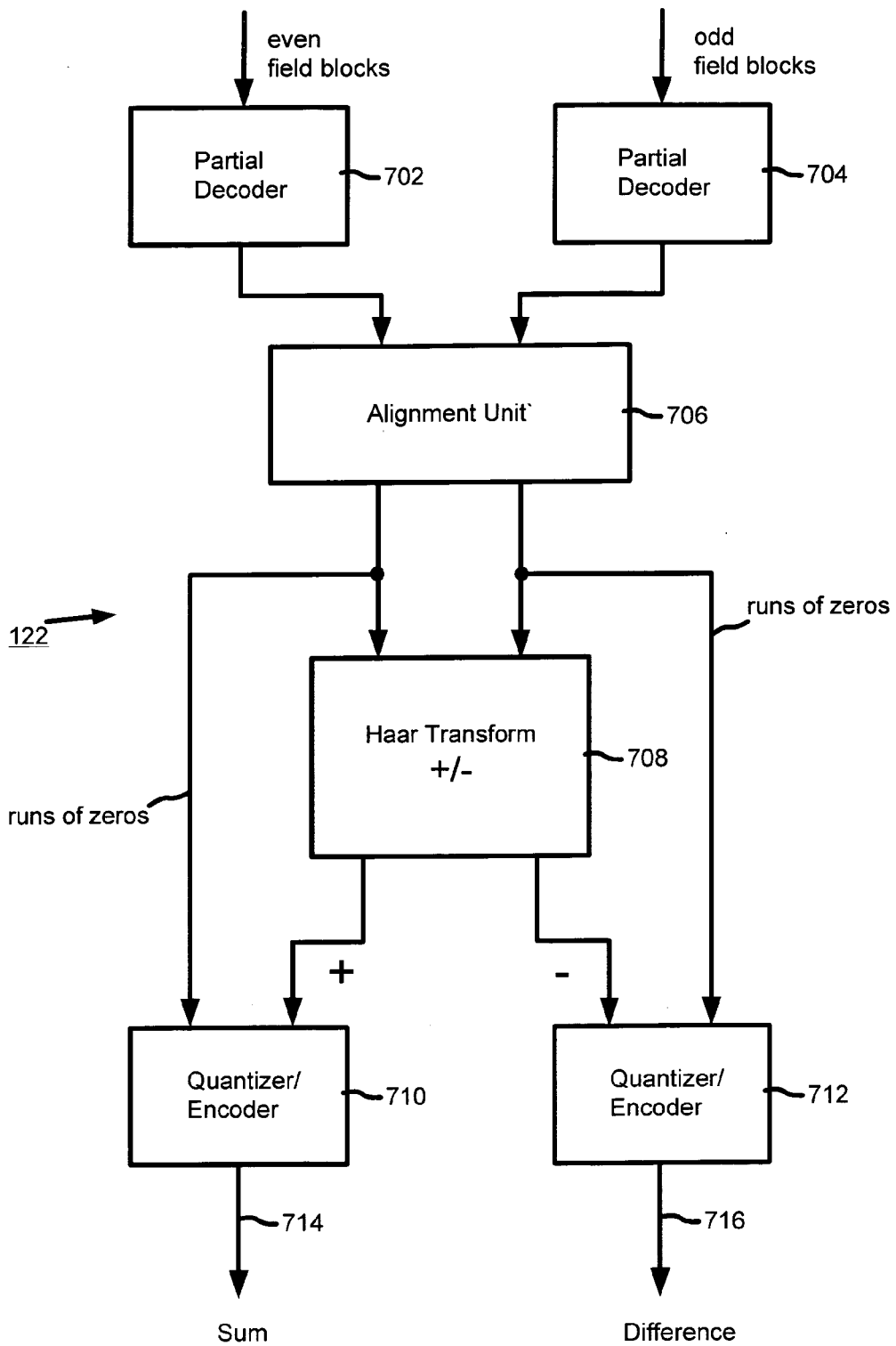
FIG. 18 illustrates an interfield Haar unit for performing a modified Haar transform upon two corresponding blocks received from field block storage.
Figures 19, 20:
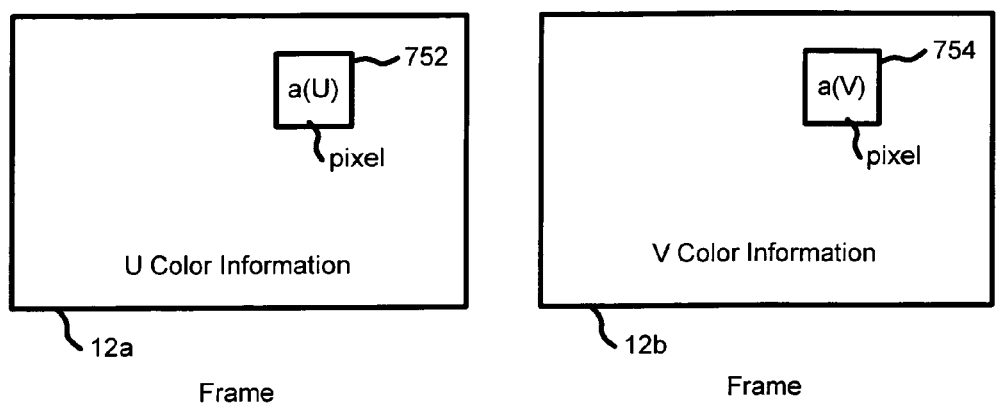
FIG. 19 illustrates frame portions that represent Y color information and U color information of a frame.
FIG. 20 illustrates a prior art technique for color rotation of frame color information into a different color coordinate system.

In steps 237–239 a modified interfield Haar transform is performed on the two corresponding blocks as described in FIGS. 17 and 18. The Haar transform is integrated with a partial decoding of the blocks, quantization and encoding. In step 240 the resulting block is output into frame block storage 126. The resulting block from interfield Haar unit 122 represents information from the two fields, i.e., twice the information content of a single block. In other words, the resultant block represents twice the amount of time as one of the two input blocks.

In step 242 the blocks recently encoded in unit 122 are input into frame block storage 126 block-by-block. Once a frame's worth of blocks are stored in storage 126, step 244 begins outputting corresponding blocks from successive frames to interframe Haar unit 130. Storage allocation within storage 126 may be performed in a wide variety of manners and is preferably implemented as described with respect to storage 118.

Steps 245–248 perform a modified interframe Haar transform on the two corresponding blocks to produce a single resultant block. This interframe Haar transform is performed in a manner analogous to the interfield Haar described in FIGS. 17 and 18. The resultant block from interframe Haar 130 represents four field's worth of information for that block. Step 250 performs a color rotation on the resultant block using color rotation unit 132 as described in FIG. 21.

In step 252 the resultant block is output as a serial bit stream. This greatly compressed serial bit stream representing original image 102 may then be transmitted or stored much more efficiently due to its greatly compressed form.

Decompression Flowchart

Figure 22:
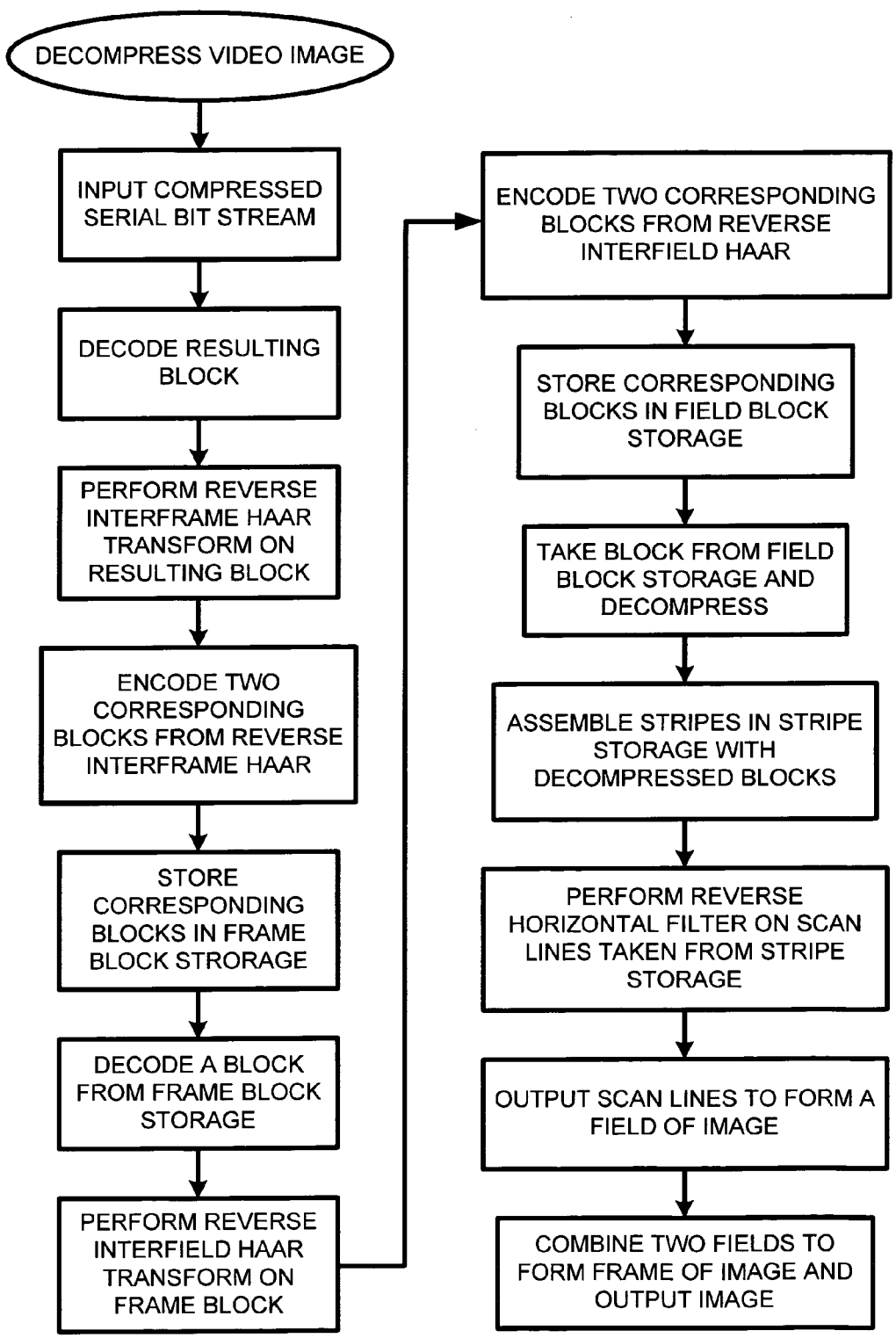
FIG. 22 is a flowchart for decompressing a compressed bit stream which corresponds to the specific compression embodiment of FIGS. 5A–5C.

Decompression of this output serial bit stream to produce original image 102 can be performed by reversing the above procedure as will be appreciated by those of skill in the art. By way of example, FIG. 22 illustrates a technique for decompressing the compressed bit stream to produce the original image that corresponds to a reversal of the steps in FIGS. 5A–5C. In general (except for quantization), each of the above steps in FIGS. 5A–5C is reversible. Modifications may also be introduced into decompression. For example, extra zeros or random noise may be introduced to compensate for quantization, and color rotation need not be performed if the data is already in a color coordinate system suitable for output. Color rotation could be performed if desired to correct for color carrier drift.

Horizontal Filter

Figure 6:
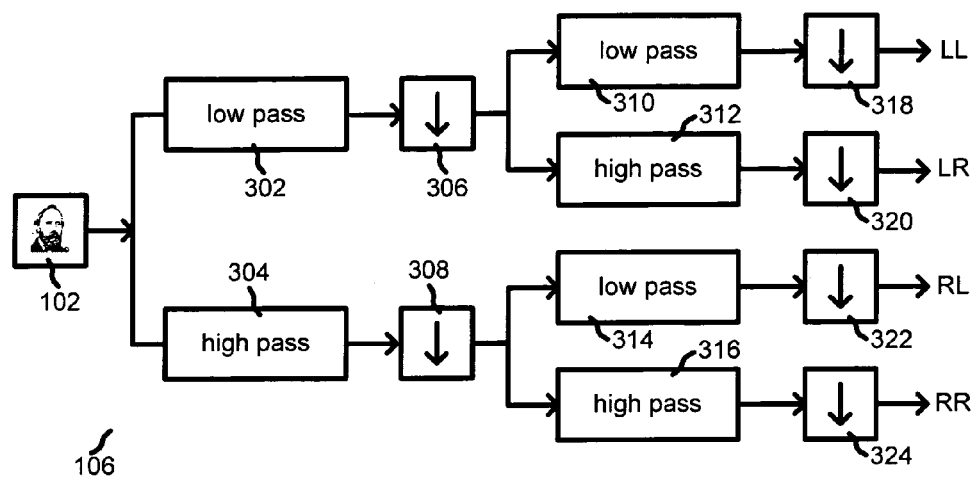
FIG. 6 illustrates symbolically a high level view of the Pass 1 horizontal filter.

FIG. 6 illustrates symbolically a high level view of horizontal filter 106 according to one embodiment. Horizontal filter 106 advantageously provides edge filtering to remove ghosts around blocks and filters the video signal into various sub-bands useful in separating color and black and white information. Digitized video image data is received from image 102. Included within filter 106 is low pass filter 302, high pass filter 304 and down samplers 306 and 308. Included within a second stage of filter 106 are low and high pass filters 310, 312 and low and high pass filters 314, 316. Each of these filters is followed by a respective down sampler 318–324. Output from down samplers 318–324 is delivered to stripe storage 110 to fill a scan line within one of the stripe buffers.

In the first stage of filter 106, pixel values from image 102 are delivered to each of low pass filter 302 and high pass filter 304. In general, filter 302 performs a form of summation of each pixel with its following pixel and filter 304 performs a form of differencing of each pixel with its following pixel. Samplers 306 and 308 down sample the results from filters 302 and 304 by a factor of two, meaning that every other sample is discarded. Results from the first stage from samplers 306 and 308 are then each passed again through low and high pass filters and down samplers in much the same way that the original signal was processed in the first stage. For example, summed pixel values output from sampler 306 are each passed to low pass filter 310 and high pass filter 312. The results from these filters are then down sampled by a factor of two in samplers 318 and 320 and the resulting values are delivered to stripe storage 110 as will be explained below. Output from sampler 308 is processed in much the same way.

Even though samplers 306 and 308 are discarding every other value, and the output of each represents half the original data, in combination the amount of data they present to stage two is the same amount of pixels received from image 102. The same holds true for stage two. Thus, in this embodiment, the total number of pixels received from image 102 is the same as the number of pixels output to stripe storage 110.

Figures 7, 8:
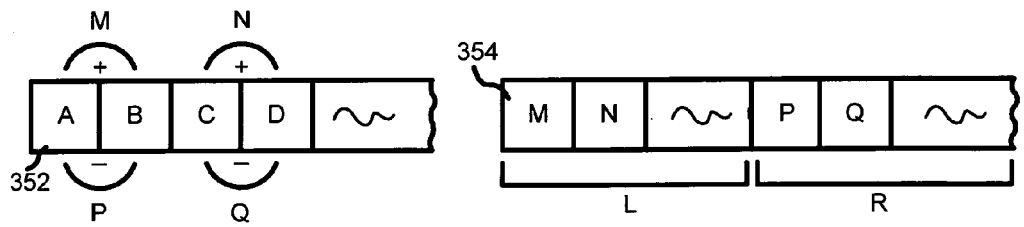
FIG. 7 illustrates stage one of the horizontal filter applied to a scan line.
FIG. 8 is an example of the scan line of FIG. 7 after stage one.

FIG. 7 illustrates the process of stage one of filter 106 of FIG. 6. Incoming scan line 352 includes a number of pixel values A, B, C and D. Pixels A, B and C, D are summed by low pass filter 302 as shown to give pixel values M and N. Similarly, pixels A, B and C, D are differenced by high pass filter 304 to produce pixel values P and Q. Due to down sampler 306, the summation of pixels B and C is discarded; likewise, sampler 308 discards the difference of pixels B and C.

FIG. 8 illustrates an example of scan line 352 after stage one of FIG. 6. Scan line 354 includes results from the summation and differencing of incoming pixel values. Low pass filter resultant pixel values M and N are stored in the left-hand side (L) of scan line 354 and high pass resultant pixel values P and Q are stored in the right-hand side (R) of scan line 354.

Figures 9, 10:
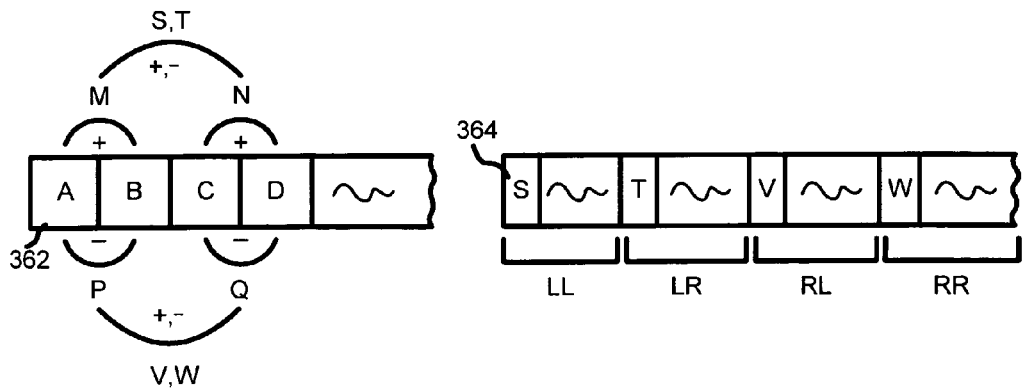
FIG. 9 illustrates stages one and two of the horizontal filter applied to a scan line.
FIG. 10 is an example of the scan line of FIG. 9 after stages one and two of the horizontal filter.

FIG. 9 illustrates the process of both stages one and two of FIG. 6. Incoming scan line 362 includes pixel values, A, B, C and D. After stage one, pixel values M and N are summed and differenced to produce values S and T respectively. Similarly, pixel values P and Q are summed and differenced to produce values V and W respectively.

FIG. 10 illustrates an example of scan line 362 after stages one and two of horizontal filter 106. Pixel value S is stored in the left half of the left-hand side of scan line 364 (LL), value T is stored in the right half of the left-hand side of the scan line 364 (LR), value V is stored in the left half of the right-hand side of the scan line (RL), and value W is stored in the right half of the right-hand side of the scan line (RR). Thus, the resultant scan line after processing by horizontal filter 106 includes four sub-bands (LL, LR, RL and RR) that are useful in separating the composite video signal as shown below in FIG. 12.

As explained above, FIGS. 6–10 illustrate in general the function of horizontal filter 106. More specifically, in one embodiment, filter 106 uses a sequence of modified 2–6 Biorthogonal filters useful in eliminating blocking artifacts. A standard 2–6 Biorthogonal filter is known in the art; the improved 2–6 Biorthogonal filter that performs modified summing and differencing will now be explained with reference to FIGS. 11A and 11B.

A standard 2–6 Biorthogonal filter can be thought of as a Haar transform in which summing and differencing of pairs of pixels are performed that is followed by an additional lifting step. The lifting step changes the difference values by combing each difference with a linear combination of corresponding sum values. Advantageously, the present invention uses an improved 2–6 Biorthogonal filter with a unique linear combination for initial and final lifted differences of each block in order to allow blocks to be processed independently.

Figures 11A, 11B:
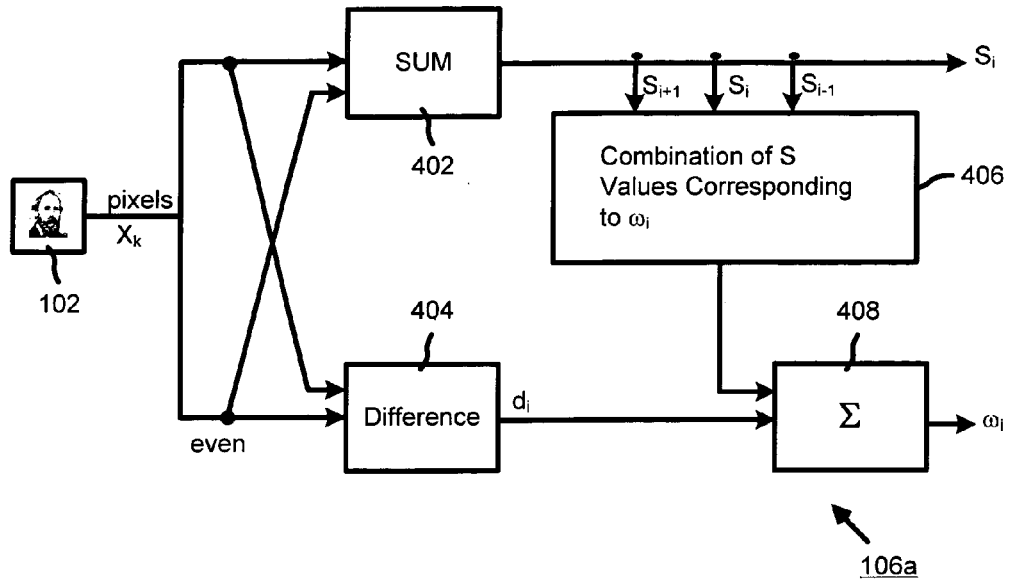
FIG. 11A illustrates one specific embodiment of the first stage of the horizontal filter.
FIG. 11B illustrates coefficients for the combination unit of FIG. 1I A according to one specific embodiment of the invention.

FIG. 11A illustrates one specific embodiment of the first stage 106a of horizontal filter 106. The second stage is preferably implemented in a similar manner. In this specific embodiment, filter 106a is an improved 2–6 Biorthogonal filter. Filter 106a receives a stream of pixel values $x_k$ from image 102 that are fed into sum unit 402 and difference unit 404. A combination unit 406 combines various sums with particular coefficients and adds the result to each difference $d_i$ in summation unit 408. The output from filter 106a is a stream of sums $s_i$ and a stream of lifted differences $w_i$.

Typically, a standard 2–6 Biorthogonal filter adjusts each difference to produce a lifted difference using the formula: $w_i = d_i - s_{i-1}/8 + s_{i+1}/8$. Thus, each difference has subtracted from it 1/8th of the previous sum and has added to it 1/8th of the following sum. In a standard 2–6 Biorthogonal filter, the actual sum corresponding to the difference being adjusted is not used to adjust the difference. Advantageously, this embodiment of the present invention provides a unique combination 406 of sum values in order to adjust each difference value in order to reduce blocking artifacts.

FIG. 11B illustrates coefficients for combination unit 406 according to one specific embodiment of the invention. To allow blocks to be treated independently and to reduce blocking artifacts the present invention uses unique coefficients for sum values including a non-zero coefficient for the sum corresponding to the difference to be adjusted. More particularly, these unique coefficients are used for the very first and the very last lifted difference values of a block ($w_0$ and $w_{n-1}$). FIG. 11B shows a table of coefficients 409 used to implement combination unit 406. Table 409 includes columns of sums 410 and rows of lifted differences 412. Each cell of Table 409 represents the coefficient used for its corresponding sum in the calculation of a lifted difference. Rows 422 and 432 illustrate traditional coefficients in a standard 2–6 Biorthogonal filter. For example, lifted difference $w_1 = d_1 - s_0/8 + s_2/8$, etc. Advantageously, Table 409 provides unique coefficient values for calculation of the first and last lifted difference values as shown in rows 420 and 434. In this specific embodiment, initial coefficients are −3/8, 1/2 and −1/8, and thus the initial lifted difference $w_0 = d_0 - 3s_0/8 + s_1/2 - s_2/8$. The final coefficients are 1/8, −1/2 and 3/8, and thus the final lifted difference $w_{n-1} = d_{n-1} + s_{n-3}/8 - s_{n-2}/2 + 3s_{n-1}/8$. These unique coefficient values for the initial and last lifted difference of filter 106a greatly reduce blocking artifacts and allow each block to be treated independently by eliminating the zero, first and second moments.

Figure 12:
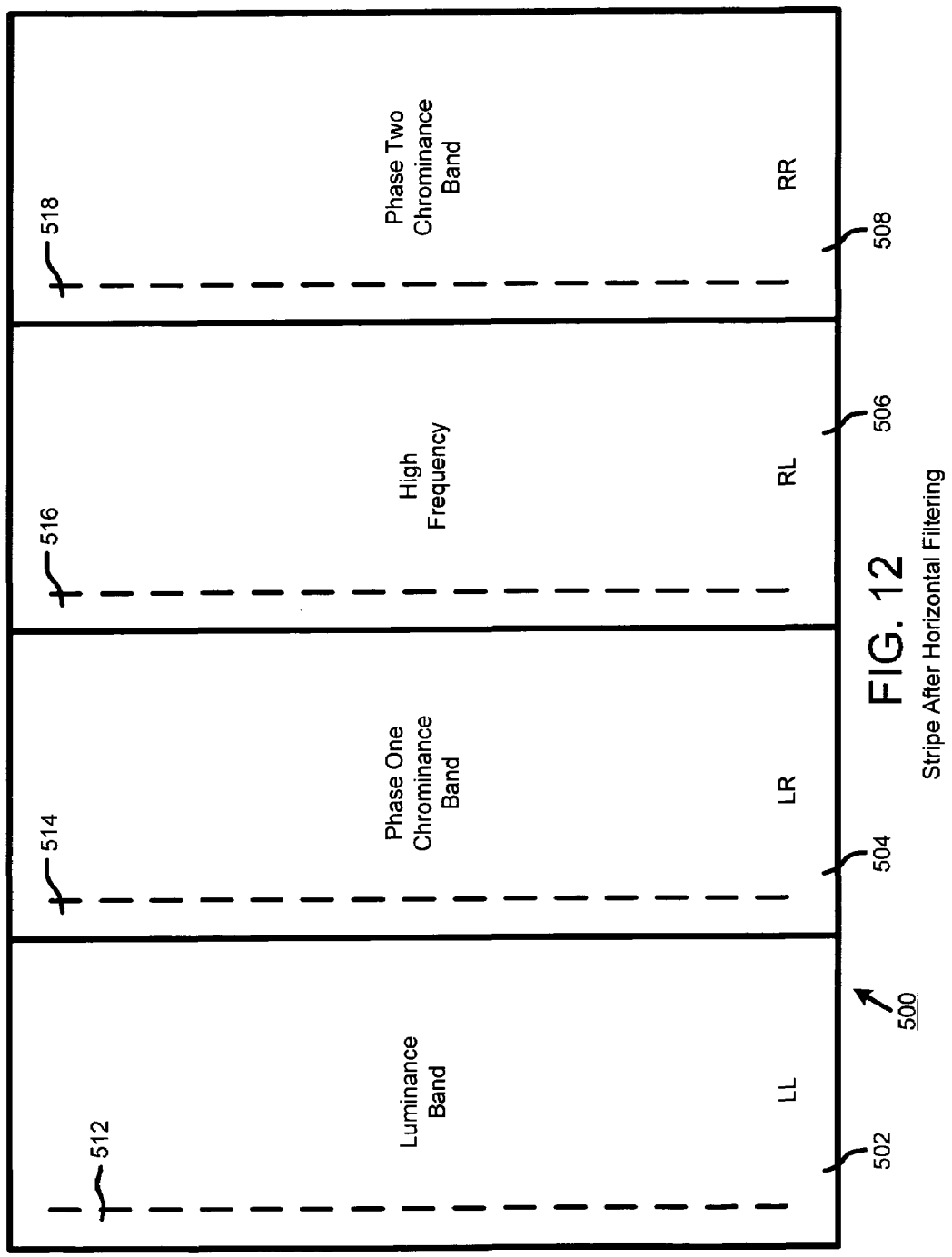
FIG. 12 illustrates a stripe in stripe storage after the horizontal filter has processed a number of scan lines.

FIG. 12 illustrates a stripe 500 in stripe storage 110 after horizontal filter 106 has processed a number of scan lines sufficient to fill up stripe 500. For example, for blocks that are 8 scan lines tall, stripe 500 represents information from 8 horizontal scan lines. Stripe 500 includes four sub-bands that have been distilled from the incoming scan lines in order to separate the video signal into color and black and white information. Luminance band 502 represents intensity information (i.e., black and white pixel values); this information has been filtered to appear in the left half of the left-hand side (LL) of stripe 500. Phase one chrominance band 504 represents color information from the first phase of the color carrier signal; this color information has been filtered to appear in the right half of the left-hand side (LR) of stripe 500. Band 506 is mostly high frequency data due to the filtering. Typically, this high frequency noise is mostly zeros and can be ignored in most situations. Phase two chrominance band 508 represents color information from the second phase of the color carrier signal; this color information has been filtered to appear in the right half of the right-hand side (RR) of stripe 500. A variety of colors may be suitably represented. In this embodiment, bands 504 and 508 represents U and V colors rotated by 45 degrees.

Passes 2–5

FIGS. 13–16 illustrate the results of performing Passes 2–5 upon a block of information 520. Block 520 is not to scale with respect to stripe 500 of FIG. 12. Block 520 may be formed in any suitable fashion from a stripe in stripe storage 110. Preferably, Block 520 is formed by taking a column of pixels from each of the bands of stripe 500. For example, to form blocks of size 8 tall by 32 pixels wide, a column of pixels 8 tall by 8 wide are taken from each of bands 502–508 (columns 512–518) and concatenated to form one 8×32 block. In this example, block 520 includes columns 512–518. Of course, blocks of other sizes may be formed, using any preferred combination of columns and/or rows from bands 502–508.

Passes 2–5 perform alternating vertical and horizontal filtering upon portions of block 520 to distill out the luminance and chrominance information from the respective bands, and ultimately from the original composite signal. Advantageously, filtering of the sub-bands in this manner provides the most importance luminance and chrominance information and allows portions of the filtered block that contain little or no information to be disregarded. Filtering phase one chrominance band 504 and phase two chrominance band 508 demodulates the original color carrier from the composite video signal and provides chrominance information. Although a variety of filters may be used, it is preferable to use modified Biorthogonal and Haar filters as described below to sum and difference adjacent pixels in order to separate out information. Preferably, the improved 2–6 Biorthogonal filter is used in passes 3, 4 and 5, although it can also be useful in passes 1 and 2.

As mentioned above, FIGS. 13–16 demonstrate further demodulation of the color carrier of the video signal. Each phase of the color carrier contains DC information. Thus, with each sum and difference performed in Passes 2–5, color information is moved into the sum part. As is shown in FIGS. 13–16, the successive filtering of the sub-bands takes the luminance and color information and "squeezes" it up into the top left-hand corner of portions 521, 529 and 535. This squeezing forms transform pyramids in regions 521, 529 and 535. Color information appears in lower portions 529 and 535 of bands 514 and 518, while luminance information appears in upper portion 521 of band 512 because of the phase reversal of the color carrier from one scan line to the next in composite video.

Figure 13:
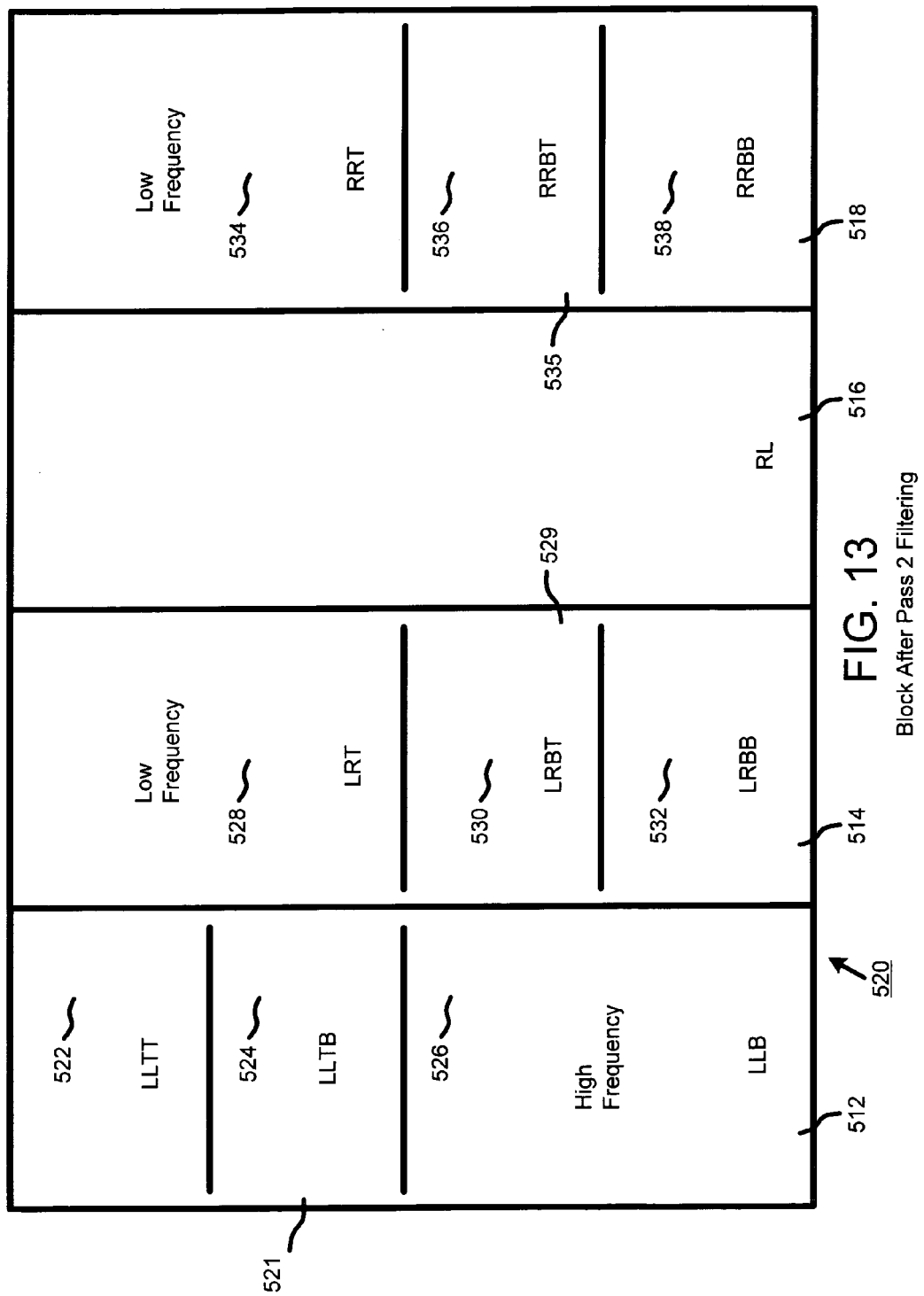
FIG. 13 illustrates a block after Pass 2 vertical filtering.

FIG. 13 illustrates block 520 after vertical filtering twice in Pass 2. The first vertical filter may use the improved Biorthogonal filter such as is shown in FIGS. 11A and 11B. Luminance band 512 is split into a low frequency portion 521 and a high frequency portion 526 (LLB). The second vertical filter uses a 2–4 linear-lifted Haar filter (known in the art) in which portion 521 is further split into a lower frequency portion 522 (LLTT) and a higher frequency portion 524 (LLTB). Because luminance information is present in lower frequencies of this band, filtering and splitting in this fashion advantageously distills out the important luminance information.

Phase one chrominance band 514 is split into a low frequency portion 528 and a high frequency portion 529 using the first vertical filter. In the second vertical filter, portion 529 is further split into a lower frequency portion 530 (LRBT) and a higher frequency portion 532 (LRBB). Because band 516 will typically represent the high frequency noise and has mostly zero values, it is not split further. Phase two chrominance band 518 is further split into a low frequency portion 534 (RRT) and a high frequency portion 535 using the first vertical filter. In the second vertical filter, portion 535 is further split into a lower frequency portion 536 (RRBT) and a higher frequency portion 538 (RRBB). Splitting of the lower portion of each of the chrominance bands 514 and 518 is performed in order to distill the important chrominance information. The lower portions of these bands represent a differencing filter; because the difference from one scan line to the next reinforces to provide chrominance information, the lower portions of these bands contain valuable color information.

Figure 14:
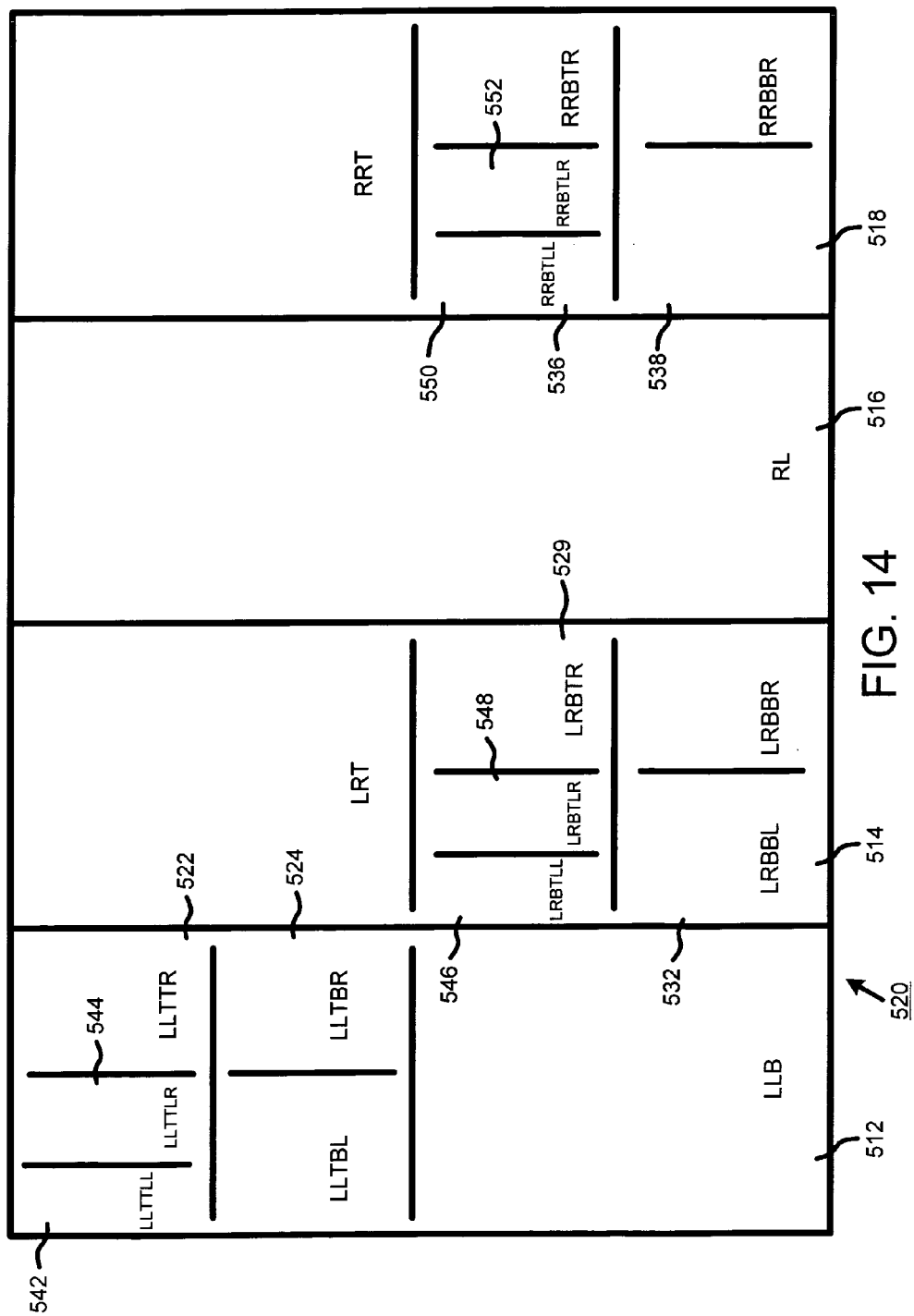
FIG. 14 illustrates a block after Pass 3 horizontal filtering.

FIG. 14 illustrates block 520 after two horizontal filters in Pass 3. Horizontal filtering is performed upon selected regions of block 520 in order to further distill out intensity information from band 512, phase one chrominance information from band 514 and phase two chrominance information from band 518. The first horizontal filter preferably uses the improved 2–6 Biorthogonal filter and the second horizontal filter uses the 2–4 linear-lifted Haar filter. Region 524 is split into two halves. Region 522 is also filtered into two halves and its left half is further split into regions 542 and 544. Region 532 is split into two halves. Region 529 is also split into two halves and its left half is further split into regions 546 and 548. Region 538 is split into two halves. Region 536 is also split into two halves and, its left-hand side is further split into regions 550 and 552. With Pass 3, luminance and color information is further being "squeezed" into regions 542, 546 and 550.

Advantageously, once Pass 3 has been completed, the luminance and chrominance information from the original composite signal has been effectively separated out for further compression. At this point, the separated luminance and chrominance information represents a video signal as if had it been received as a component video (i.e., three separate signals), although the luminance and chrominance information at this point has also been transformed and compressed by the present invention.

Figure 15:
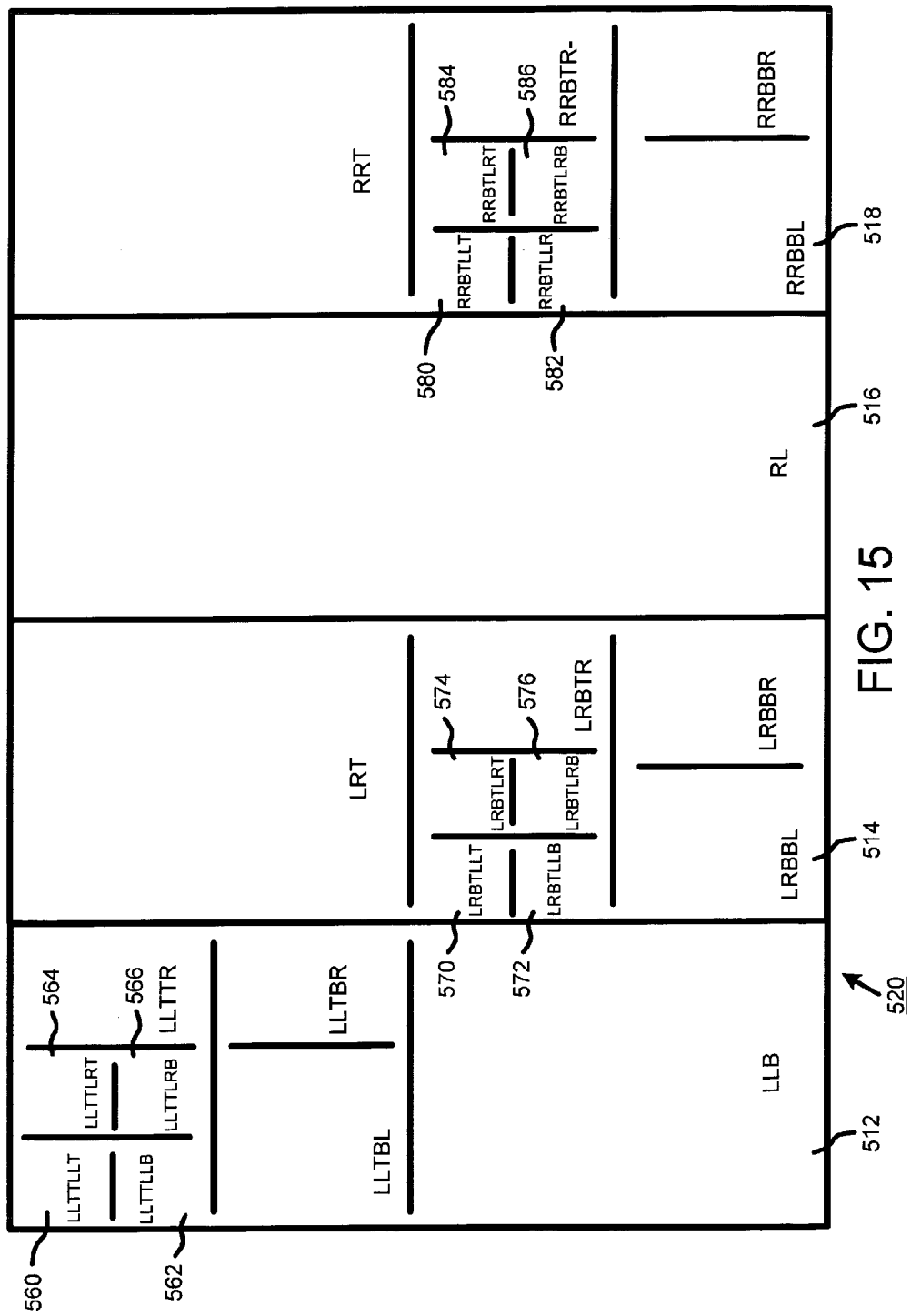
FIG. 15 illustrates a block after Pass 4 vertical filtering.

FIG. 15 illustrates block 520 after a vertical filter in Pass 4. In Pass 4, the improved 2–6 Biorthogonal filter is applied to selected regions to further distill luminance and chrominance information (although a standard Haar filter may also be used). Region 542 of luminance band 512 is further split into regions 560 and 562. Region 544 is split into regions 564 and 566. Region 546 of chrominance band 514 is split into regions 570 and 572. Likewise, region 548 is split into regions 574 and 576. Region 550 of chrominance band 518 is split into regions 580 and 582. Likewise, region 552 is split into regions 584 and 586. In this fashion, luminance and Color information is further being isolated in regions 560, 570 and 580.

Figure 16:
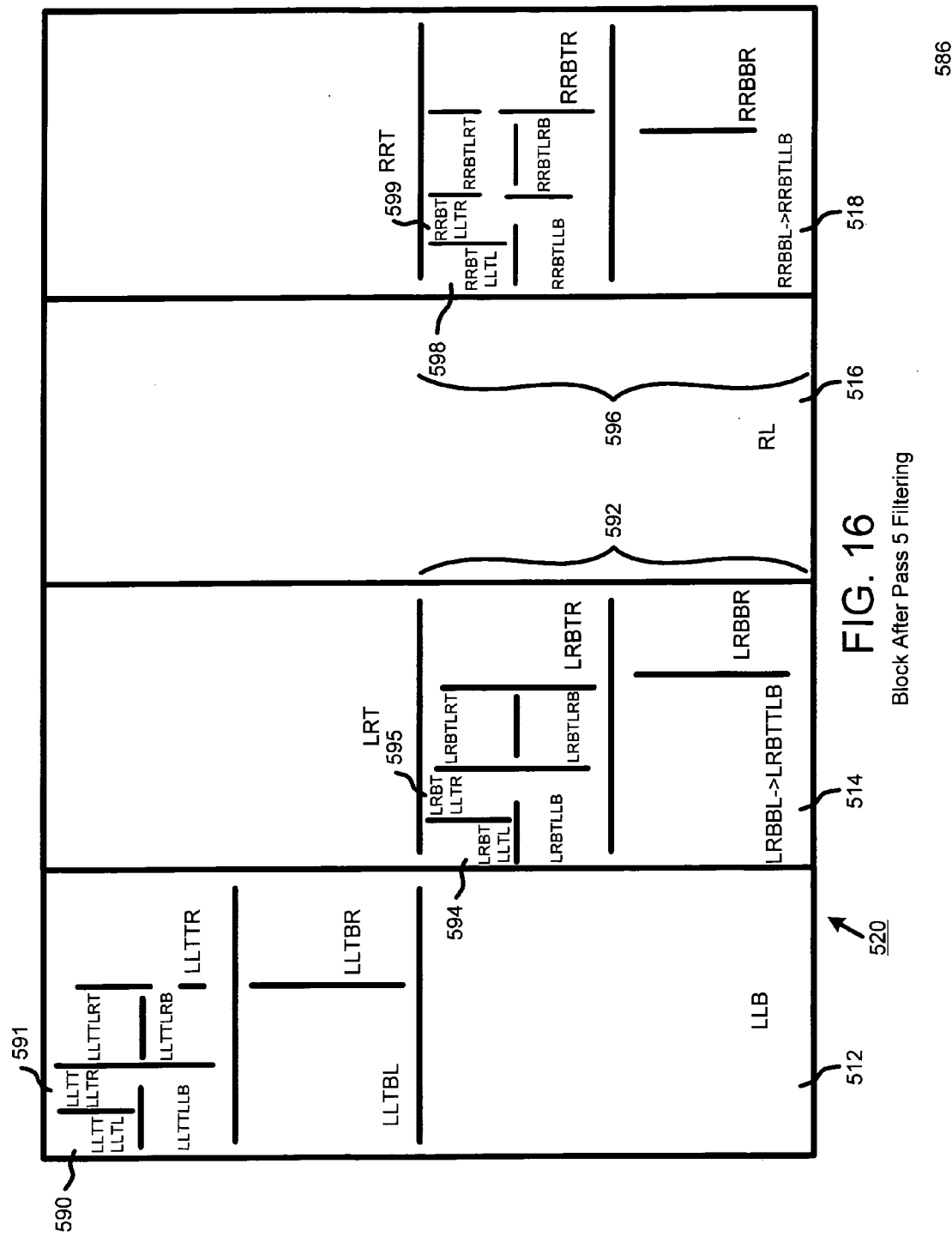
FIG. 16 illustrates a block after Pass 5 horizontal filtering.

FIG. 16 illustrates block 520 after a horizontal filter in Pass 5. In Pass 5, the improved 2–6 Biorthogonal filter is applied once again to selected regions to further distill luminance and chrominance information (although a standard Haar filter may also be used). Region 560 of luminance band 512 is split into regions 590 and 591. Region 570 of chrominance band 514 is split into regions 594 and 595. Region 580 of chrominance band 518 is split into regions 598 and 599. At this point, most all of the luminance and color information from the original video signal has been isolated in regions 590, 594 and 598. Because the original block size is 8 rows of scan lines by 32 pixels wide, regions 590, 594 and 598 represent one pixel value and further filtering and splitting is not necessary.

Pixel value 590 now contains the important luminance information for the block, that is, the average luminance for the block. Similarly, pixel values 594 and 598 of bands 514 and 518 each contain the respective average colors for that chrominance band for the block. Thus, luminance or color information for each band has been compressed; a single coefficient for each band describes in relatively few bits the average luminance or color for the block. (I.e., values 594 and 598 hold the DC coefficients for each band.) These coefficients are relatively larger than their surrounding coefficients. For example, coefficients 590, 594 and 598 may have 9 bits, while their next closest coefficients (to the right and down) have 7 bits, the next closest have 3 bits, etc. Coefficients surrounding value 590 provide the luminance differences from one side of the block to the other, while those coefficients surrounding values 594 and 598 provide the color differences from one side of the block to the other (i.e., color variations within the block). After these passes, so-called "transform pyramids" have been formed in regions 592 and 596.

It should be appreciated that for blocks having larger sizes that further vertical and horizontal filtering would be desirable to further isolate the color carrier information. Of course, for blocks having smaller sizes a fewer number of passes may be sufficient.

Modified Haar Transform

FIG. 17 illustrates the general concept behind a Haar transform 650 that is useful in Haar units 122 and 130. In general, a Haar transform computes sums and differences between corresponding blocks of frames or fields. FIG. 17 illustrates a combined interfield and interframe Haar transform. Frame 652 includes fields 654 and 656; frame 662 includes fields 664 and 666. Frame 652 and frame 662 follow one another in time or are otherwise related. Each of the fields contains a respective block 670a, 670b, 670c or 670d that correspond to each other with regard to their location within the field. Blocks 670a–670d may also correspond to one another in another fashion or be otherwise related. The Haar transform begins by computing 680 a sum and a difference between blocks 670a and 670b of frame 652. Next, computation 682 provides the sum and difference between blocks 670c and 670d of frame 662. Next, the process computes the sum of the two sums from the two frames, and the difference of the differences between the pairs of fields. Thus, an overall sum and a difference 684 is produced between two successive frames. Although any of these values may be output as a result of the Haar transform, typically four values are output: the difference between fields 654 and 656; the difference between fields 664 and 666; the difference between these previous differences (the difference between frame 652 and 662); and the sum of frames 652 and 662. Such a comparison process such as the Haar is applicable for progressive, interlaced or other type of scan.

FIG. 18 illustrates interfield Haar unit 122 for performing a modified Haar transform upon two corresponding blocks received from storage 118. Unit 122 receives corresponding blocks from even and odd fields from storage 118 into partial decoders 702 and 704 respectfully. Alignment unit 706 performs any additional decoding if needed and aligns the bit streams. Alignment unit 706 is useful because the previous variable length encoding has placed the corresponding coefficients from corresponding blocks out of alignment. Non-zero coefficients pass through Haar transform 708 while runs of zeros and are passed directly to quantizer/encoders 710 and 712. These quantizer/encoders receive results from Haar transform 708 and runs of zeros from alignment unit 706 and perform further encoding if necessary and output the sum 714 and the difference 716 of the two corresponding blocks for delivery to frame block storage 126. Quantizer/encoders 710 and 712 perform quantization and encoding of the block in a manner similar to steps 226 and 232. It should be appreciated that different parameters for a different encoding technique may be used at this step, or that a different encoding technique may be used altogether.

Haar transform 708 is preferably one-bit wide, thus providing extremely fast comparisons. Further separation of chrominance information may also be performed here. Interframe Haar unit 130 is preferably constructed in much the same way as unit 122 except that blocks of corresponding frames are being compared rather than blocks of fields.

Color Rotation

Figure 21:
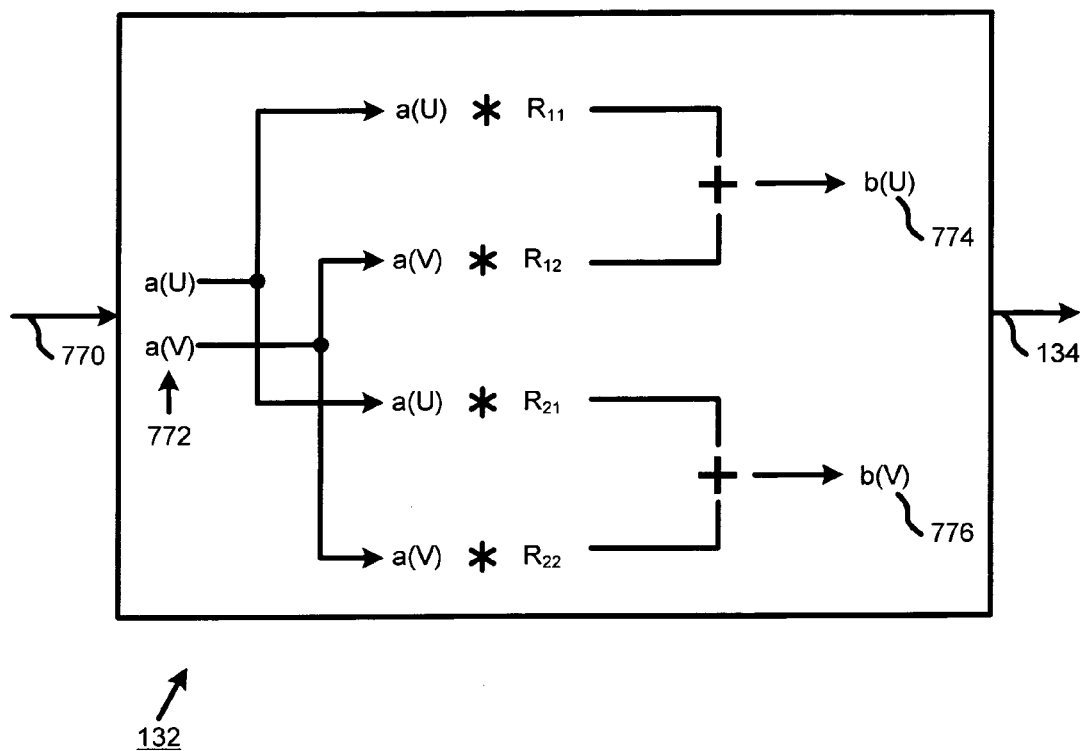
FIG. 21 illustrates a color rotation unit for performing color rotation in conjunction with a specific embodiment of the invention.

FIG. 21 illustrates a color rotation unit 132 for use in performing efficient color rotation in conjunction with the embodiment of the invention described. Unit 132 converts color information from one coordinate system into another. Advantageously, conversion between systems (such as YIQ, YUV, RGB, or modifications of these) is integrated with compression and does not require expensive matrix multiplications. In general, color rotation of a color signal may occur before data transformation in module 114 or after transformation because both operations commute with one another. Advantageously, pairs of pixels from chrominance transform pyramids 592 and 596 are rotated using a rotation matrix after transformation. After transformation, many pairs are zeros or very small numbers, meaning that computation is far simpler.

Color rotation unit 132 may perform rotation at any suitable point within system 100. Preferably, rotation is performed after transformation in module 114 to take advantage of the concentration of color information in chrominance transform pyramids 592 and 596 (and the corresponding increase in zero values). More preferably, rotation is performed after quantization and encoding in module 114 to take further advantage of elimination of zero coefficients and leading zeros on small coefficients. Even more preferably, rotation occurs after either Haar unit 122 or Haar unit 130 to take further advantage of the compression performed in these units, with color rotation unit 132 being placed after Haar unit 130 the most preferable as the data is the most compressed at this point. Thus, rotation is performed on a compressed block in the transform domain which has far fewer bits than an decompressed block.

As explained above, rotation converts from one coordinate system to another. In a particular embodiment of the present invention, Passes 2–5 create chrominance signals that correspond to a YUV signal rotated by 45 degrees. Color rotation unit 132 is used to correct for this introduced rotation, or to place the signal into another color coordinate system. Unit 132 is not strictly necessary. For example, if the video information compressed using system 100 does not need to be converted into another coordinate system for use, color rotation may not be needed.

Color Rotation unit 132 receives compressed bit stream 770 from Haar unit 130. Bit stream 770 presents pairs of pixel coefficients 772 one after another least significant bit (LSB) first in serial form. Preferably, only significant bits are presented. Unit 130 performs a serial by parallel multiply. Coefficients 772 are multiplied with rotation matrix elements R(11), R(12), R(21), and R(22) as shown and the results summed to provide pixel pair b(U) and b(V) in a new coordinate system. The new pair is then output from unit 130 in serial bit stream form. Values for the elements of the rotation matrix are chosen to convert to the color coordinate system desired; such values are known in the art. Pixel coefficients 772 follow one another in the bit stream because they can be read from random-access memory in the desired order.

A serial by parallel multiply is a known technique for multiplying a serial multiplier (a coefficient) by a parallel multiplicand (a rotation matrix element). Advantageously, the data rate in system 100 is low enough that such a bit serial multiplier can be used instead of an expensive parallel multiplication. For example, a data rate on the order of 15 Mb/s is low enough to allow such a bit serial multiplier to be used.

Such a serial by parallel multiply in binary uses shift and add operations, and is also referred to as a parallel adder. Such a serial by parallel multiply instead of parallel multiplication can be implemented in a much smaller integrated circuit. For example, whereas a color rotation unit using parallel multiplication of coefficients and matrix elements might take up a large amount of space on an integrated circuit, such a unit implemented using the techniques described herein might reduce space needed by a factor of 10. Thus, an integrated circuit embodying the present invention can be made much smaller, and/or have room for other functionality.

Furthermore, because the color rotation is integrated with a compression algorithm that is able to treat blocks independently, rotation of pixels locally can occur as the bit stream is flowing through system 100 without the need to store a field or a frame of information before rotation can occur. As a block (or other portion of an image) in compressed form representing two chrominance signals is passing through system 100, the two signals can be rotated by operating directly upon the compressed block. Color rotation is integrated with compression without the need to perform rotation on a separate device.

Computer System Embodiment

Figure 23:
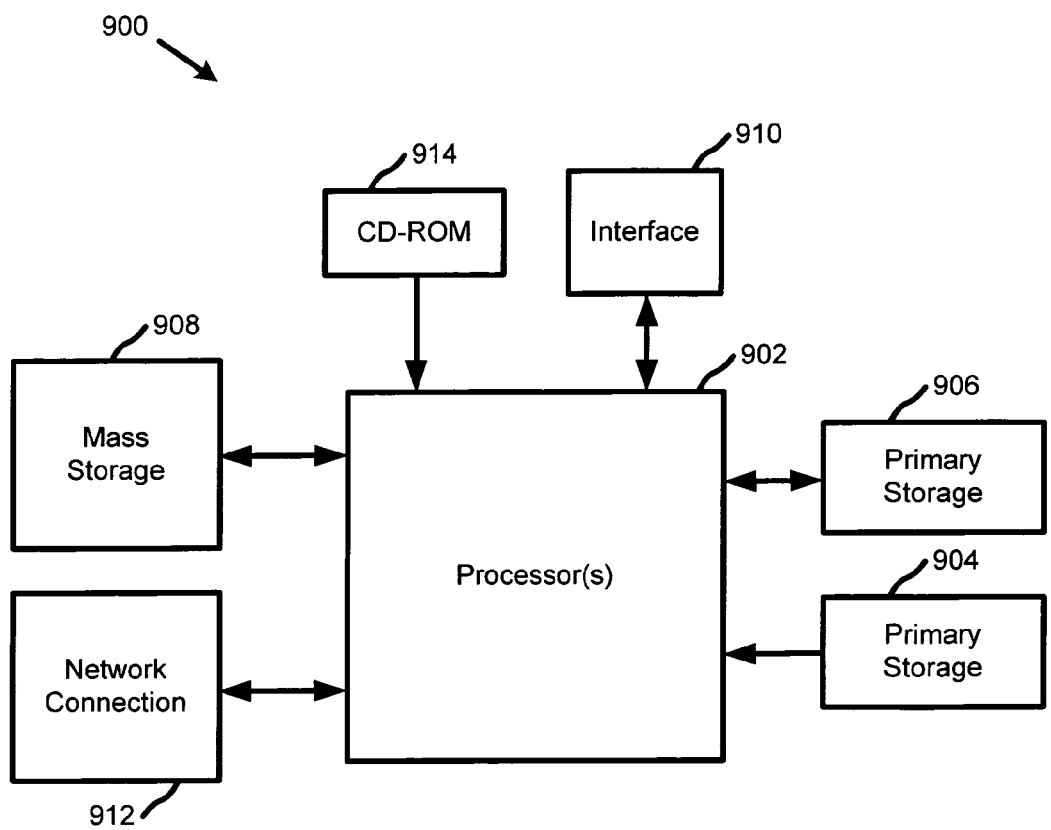
FIG. 23 is a block diagram of a typical computer system suitable for implementing an embodiment of the present invention.

FIG. 23 illustrates a computer system 900 in accordance with an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps. Furthermore, method embodiments of the present invention may execute solely upon CPU 902 or may execute over a network connection such as the Internet in conjunction with a remote CPU that shares a portion of the processing.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as application-specific integrated circuits (ASICs), programmable logic devices (PLDs) and ROM and RAM devices. Examples of program code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, the present invention is applicable to a wide variety of still images, video images and higher dimension data. For example, the present invention applies to two-dimensional still images, three-dimensional video images, and four-dimensional seismic information. In general, the present invention is useful for the compression and decompression of multi-dimensional information. The invention is applicable to a variety of video standards including composite video, S video and others. Direct compression of a combined video signal (which combines color and/or black and white) is applicable to composite video, S video and other similar signals. Temporary compression of blocks is applicable to a wide variety of compression techniques in addition to those described herein. Also, color rotation may be performed between a wide variety of color spaces. The border filters described herein are also applicable to other portions of frames and fields in addition to blocks. Therefore, the described embodiments should be taken as illustrative and not restrictive, and the invention should not be limited to the details given herein but should be defined by the following claims and their full scope of equivalents.

We claim:

1. A method of decompressing compressed video information comprising:
   receiving a compressed bit stream of video information including a compressed portion;
   performing a reverse combination in the transform domain on said compressed portion to produce two corresponding portions of video information, said two portions representing said compressed portion in a less compressed form;
   temporarily storing said two portions of video information as said reverse combination is being performed;
   transforming, decoding and decompressing one of said two portions of video information to produce a decompressed portion of video information; and
   outputting said decompressed portion of video information, whereby said method uses relatively less temporary storage.

2. An integrated circuit for decompressing compressed video information arranged to perform the following:
   receiving a compressed bit stream of video information including a compressed portion;
   performing a reverse combination on said compressed portion to produce two corresponding portions of video information, said two portions representing said compressed portion in a less compressed form in a transform domain;
   temporarily storing said two portions of video information as said reverse combination is being performed;
   transforming, decoding and decompressing one of said two portions of video information to produce a decompressed portion of video information; and
   outputting said decompressed portion of video information, whereby said integrated circuit uses relatively less temporary storage.

3. A system for decompressing compressed video information comprising:
   a processor; and a memory coupled with the processor, wherein the memory is configured to provide the processor with instructions which when executed cause the processor to:

receive a compressed bit stream of video information including a compressed portion;

perform a reverse combination in the transform domain on said compressed portion to produce two corresponding portions of video information, said two portions representing said compressed portion in a less compressed form;

temporarily store said two portions of video information as said reverse combination is being performed;

transform, decode and decompress one of said two portions of video information to produce a decompressed portion of video information; and output said decompressed portion of video information, whereby said method uses relatively less temporary storage.

4. A computer program product for decompressing compressed video information, the computer program product being embodied in a computer readable medium and comprising computer instructions for:

receiving a compressed bit stream of video information including a compressed portion;

performing a reverse combination in the transform domain on said compressed portion to produce two corresponding portions of video information, said two portions representing said compressed portion in a less compressed form;

temporarily storing said two portions of video information as said reverse combination is being performed;

transforming, decoding and decompressing one of said two portions of video information to produce a decompressed portion of video information; and outputting said decompressed portion of video information, whereby said method uses relatively less temporary storage.

* * * * *